US006988357B2

(12) United States Patent
Dev

(10) Patent No.: US 6,988,357 B2
(45) Date of Patent: *Jan. 24, 2006

(54) NESTED CORE GAS TURBINE ENGINE

(76) Inventor: Sudarshan Paul Dev, 5B Daisy Dr., Seymour, CT (US) 06483

( * ) Notice: Subject to any disclaimer, the term of this patent is extended or adjusted under 35 U.S.C. 154(b) by 0 days.

This patent is subject to a terminal disclaimer.

(21) Appl. No.: 10/635,956

(22) Filed: Aug. 7, 2003

(65) Prior Publication Data
US 2004/0025495 A1 Feb. 12, 2004

Related U.S. Application Data

(63) Continuation of application No. 09/947,002, filed on Sep. 5, 2001, now Pat. No. 6,647,707.
(60) Provisional application No. 60/230,891, filed on Sep. 5, 2000.

(51) Int. Cl.
F02C 3/073 (2006.01)

(52) U.S. Cl. .............. 60/39.43; 60/268; 60/39.823; 60/269

(58) Field of Classification Search ......... 60/39.35, 60/39.43, 723, 805, 268, 269, 39.162, 789, 60/39.823; 415/77, 79, 86, 87, 66–69; 416/126, 416/230
See application file for complete search history.

(56) References Cited

U.S. PATENT DOCUMENTS

| 2,430,399 | A |   | 11/1947 | Heppner ............... 60/35.6 |
| 2,441,488 | A |   | 5/1948  | Howell |
| 2,454,738 | A |   | 11/1948 | Hawthorne |
| 2,579,049 | A | * | 12/1951 | Price ................. 60/39.35 |
| 3,124,933 | A | * | 3/1964  | Stram, Jr. et al. ...... 60/39.823 |
| 3,363,419 | A |   | 1/1968  | Wilde ................. 60/226 |
| 3,462,953 | A |   | 8/1969  | Wilde et al. ........... 60/226 |
| 3,496,725 | A |   | 2/1970  | Ferri et al. ........... 60/204 |
| 3,635,577 | A |   | 1/1972  | Dee ................... 415/79 |
| 4,040,252 | A |   | 8/1977  | Mosier et al. .......... 60/39.36 |
| 4,286,431 | A | * | 9/1981  | Reichard et al. ....... 60/39.823 |
| 4,786,347 | A | * | 11/1988 | Angus ................ 416/198 A |
| 4,969,326 | A | * | 11/1990 | Blessing et al. ........ 60/226.1 |
| 5,014,508 | A |   | 5/1991  | Lifka ................. 60/224 |
| 5,224,339 | A |   | 7/1993  | Hayes ................. 60/39.43 |
| 5,241,815 | A |   | 9/1993  | Lee et al. ............ 60/39 |
| 5,273,401 | A | * | 12/1993 | Griffin ............... 416/193 R |
| 6,003,297 | A |   | 12/1999 | Ziegner |
| 6,125,625 | A |   | 10/2000 | Lipinski et al. ........ 60/39.141 |
| 6,374,592 | B1 | * | 4/2002 | Box et al. ............ 60/789 |

FOREIGN PATENT DOCUMENTS

DE 23 61 310 6/1975

* cited by examiner

Primary Examiner—Ted Kim
(74) Attorney, Agent, or Firm—Perman & Green, LLP

(57) ABSTRACT

A gas turbine engine comprising a combustion chamber section, a turbine section, and a compressor section. The turbine section surrounds the combustion chamber and the compressor section surrounds the turbine section.

17 Claims, 46 Drawing Sheets

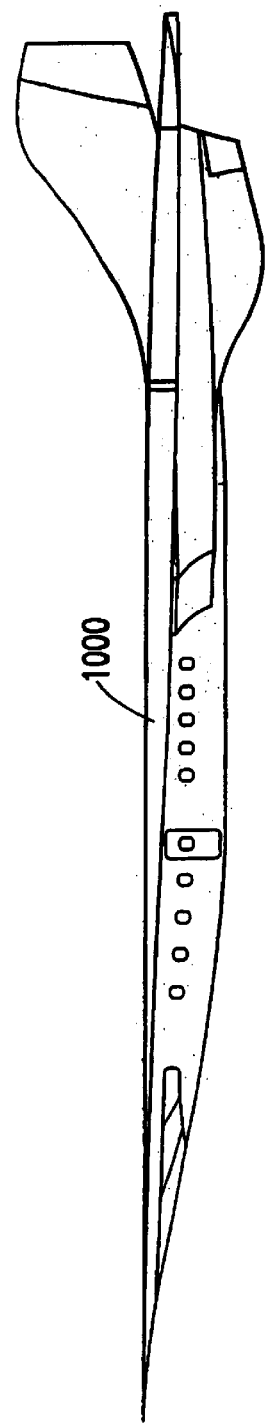
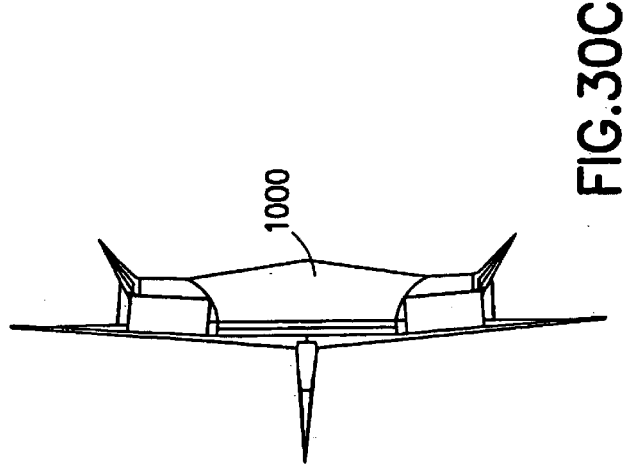
FIG.30C
FIG.30D

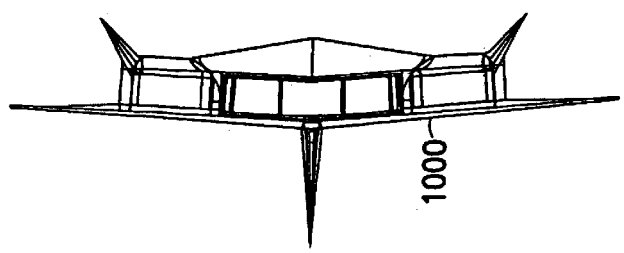
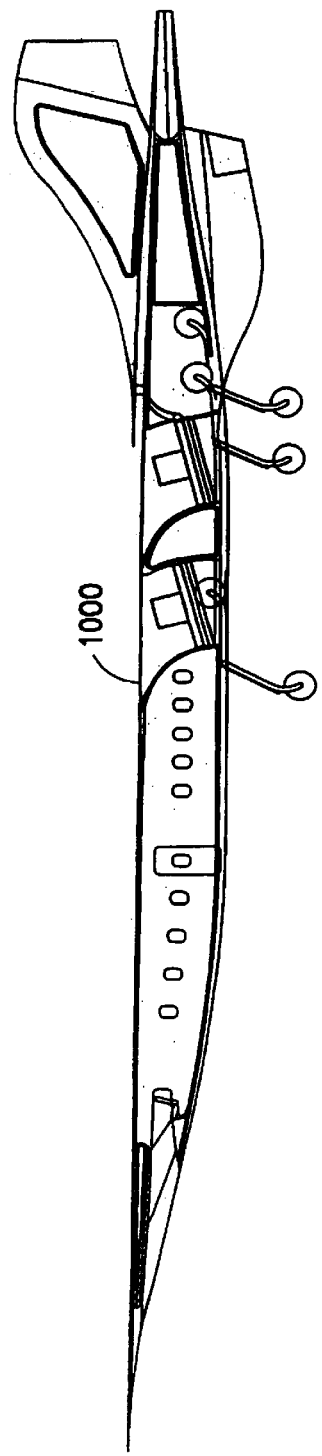
FIG.31C
FIG.31D

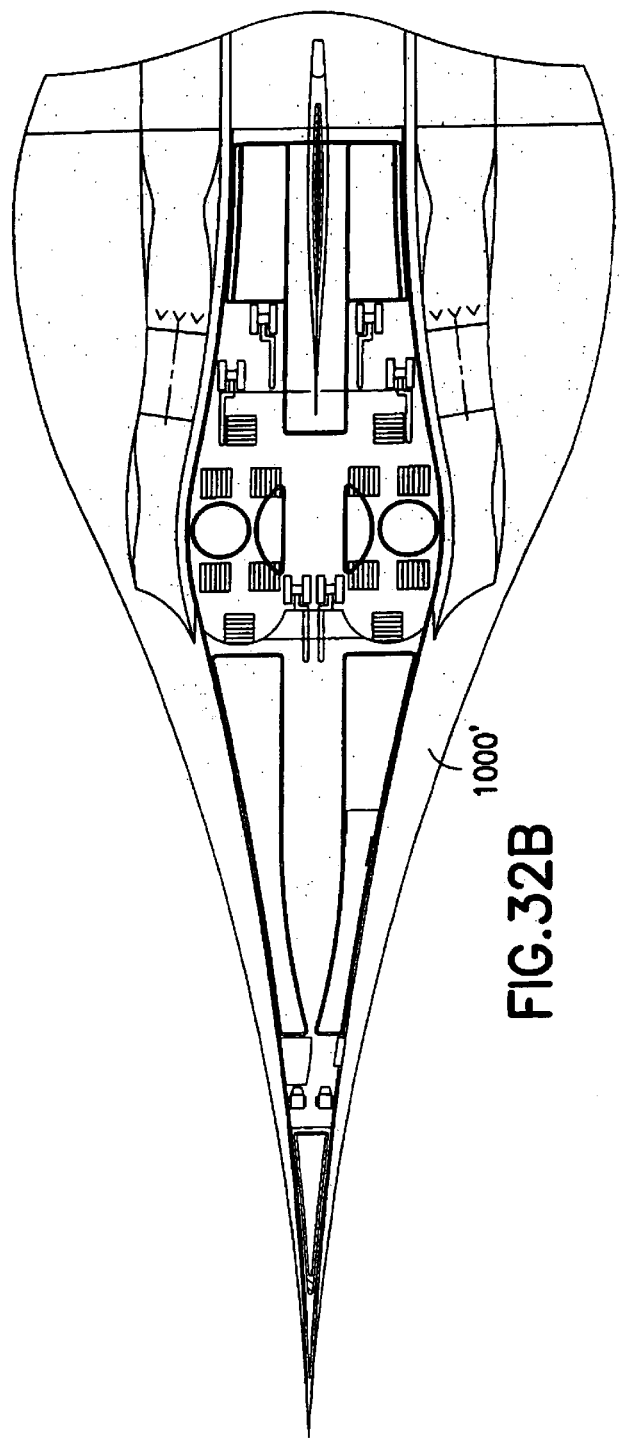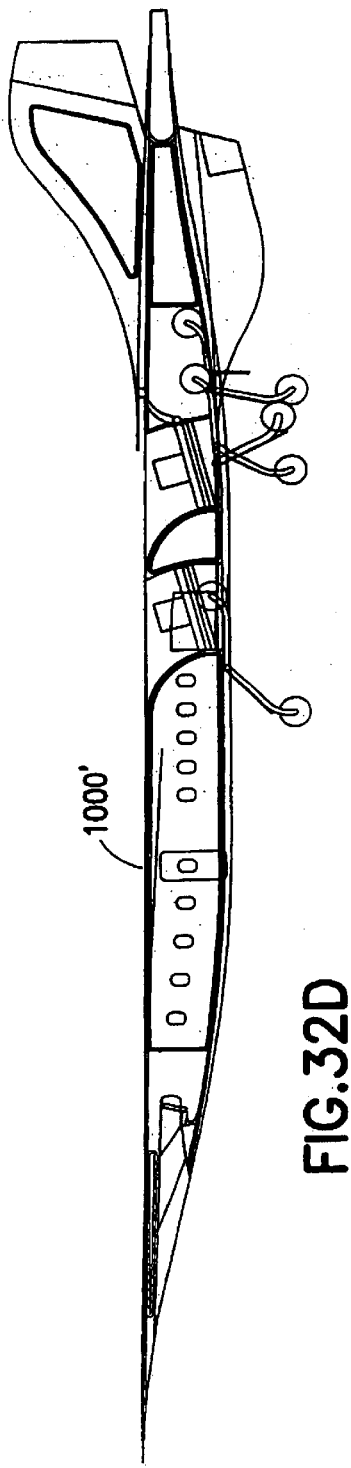
FIG.32B
FIG.32D

NESTED CORE GAS TURBINE ENGINE

CROSS-REFERENCE TO RELATED APPLICATION(S)

This application is a continuation from application Ser. No. 09/947,002, filed Sep. 5, 2001, now U.S. Pat. No. 6,647,707, which claims the benefit of U.S. Provisional Application No. 60/230,891, filed Sep. 5, 2000, which is incorporated by reference herein in its entirety.

BACKGROUND OF THE INVENTION

1. Field of the Invention

The present invention relates to gas turbine engines and, more particularly, to a small gas turbine engine.

2. Previous Developments

At large power levels (thousands of horsepower), turbine engines are the most compact and lightest power systems available, and have completely taken over the market for large aircraft. However, scaled-down versions of these conventional gas turbine engines offer relatively poor power/weight ratio and high specific fuel consumption. FIG. 2A illustrates that for small engines power/weight ratios versus rated power is low. FIG. 2B illustrates that for small engines specific fuel consumption versus rated power is high. There are a variety of reasons why small gas turbine engines do not perform as well as the larger engines. These include:

1. REYNOLDS NUMBER EFFECTS: Due to smaller characteristic dimensions, small compressor and turbine blades suffer from larger friction coefficients and greater aerodynamic losses.
2. THICKNESS/CHORD RATIOS: Due to physical difficulties in manufacturing very thin blades with adequate strength, airfoils used in small engines typically have larger thickness/chord ratios and relatively blunt leading edges. This causes larger aerodynamic losses due to profile drag and wave drag.
3. LARGE RELATIVE TIP CLEARANCES: Due to differences in relative centrifugal and thermal growths of rotors and shrouds, and the effects of scaling, small compressors and turbines suffer from larger relative tip clearances (ratios of absolute tip clearance to blade span). This in turn causes large tip leakage losses and lower component performance and efficiency.
4. LOWER CYCLE PRESSURE RATIOS: Small turbine engines with high cycle pressures need extremely small blade heights. These are difficult to manufacture, have large tip clearance losses, and suffer from boundary layers occupying a large fraction of passage heights. Consequently, small engines are limited to low pressure ratios, resulting in lower specific power (per unit mass flow), and low cycle efficiency.
5. LOWER PEAK CYCLE TEMPERATURES: Large gas turbine engines can have intricate cooling passages in their large nozzle vanes and turbine blades. These convection, film and transpiration cooling schemes allow gas temperatures significantly higher than the structural capability of conventional turbine materials (metals), for high specific power and cycle efficiency. Similar cooling schemes are too complex and expensive for the small blade sizes of small gas turbines, causing them to be limited to lower temperatures and lower performance levels.

The present invention addresses these problems, and mitigates at least some of them, for improved power density and efficiency as will be described in greater detail below. Accordingly, amongst the objects of the present invention is to provide a lightweight/high-power density engine, having the ability to use military-standard high-energy fuels, such as JP8 or JP5. The engine has low observables including noise, smoke and infra-red signatures, and adequate life, to enable its use for reusable air vehicles, and affordable cost, to enable its use for expendable/attritable air vehicles. The engine can also be scaled up, as well as down, offering higher power/weight compared to current gas turbine engines of conventional design.

SUMMARY OF THE INVENTION

In accordance with the first embodiment of present invention, a gas turbine engine is provided. The gas turbine engine comprises a combustion chamber section, a turbine section, and a compressor section. The turbine section surrounds the combustion chamber section. The compressor section surrounds the turbine section.

In accordance with a second embodiment of the present invention, a gas turbine engine is provided. The gas turbine engine comprises an outer casing, a first rotor, and a second rotor. The first rotor is located in the outer casing. The second rotor is located in the outer casing. The first rotor has a first compression portion and a first turbine portion, the first compression portion being surrounded by the turbine portion of the first rotor.

BRIEF DESCRIPTION OF THE DRAWINGS

The foregoing aspects and other features of the present invention are explained in the following description, taken in connection with the accompanying drawings, wherein:

FIGS. 30A–30D are respectively schematic front elevation, plan, rear elevation and side elevation views of a high speed air vehicle embodiment according to the present invention;

FIGS. 31A–31D are respectively schematic front elevation, plan, rear elevation and side elevation views of the high speed air vehicle in FIG. 30A; and FIGS. 32A–32D are respectively schematic front elevation, plan, rear elevation and side elevation views of another high speed air vehicle embodiment according to the present invention.

DETAILED DESCRIPTION OF THE PREFERRED EMBODIMENT

Figure 1:
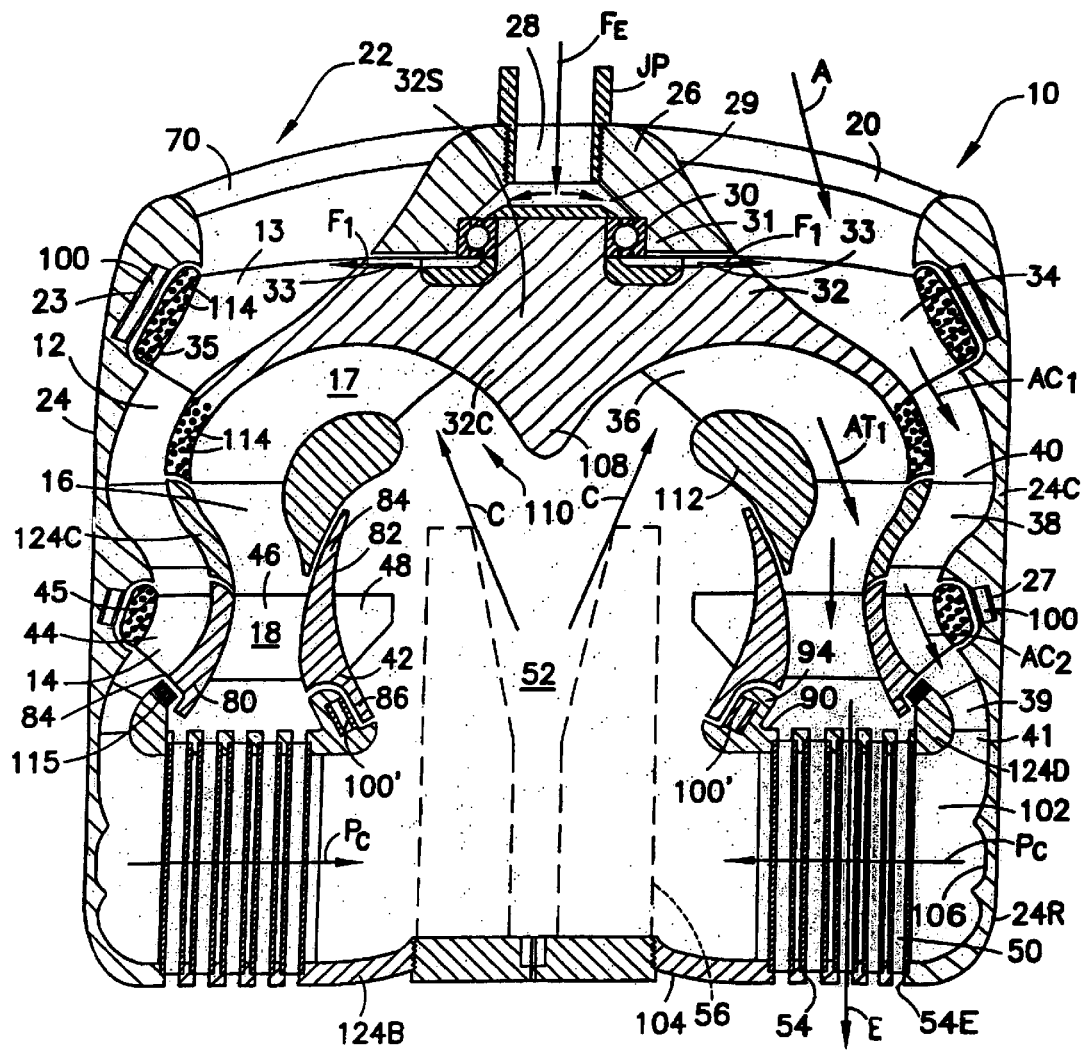
FIGS. 1–1A respectively are a schematic cross-sectional view and a schematic perspective cut-away view of a gas turbine engine incorporating features of the present invention in accordance with a first preferred embodiment.
Figure 1A:
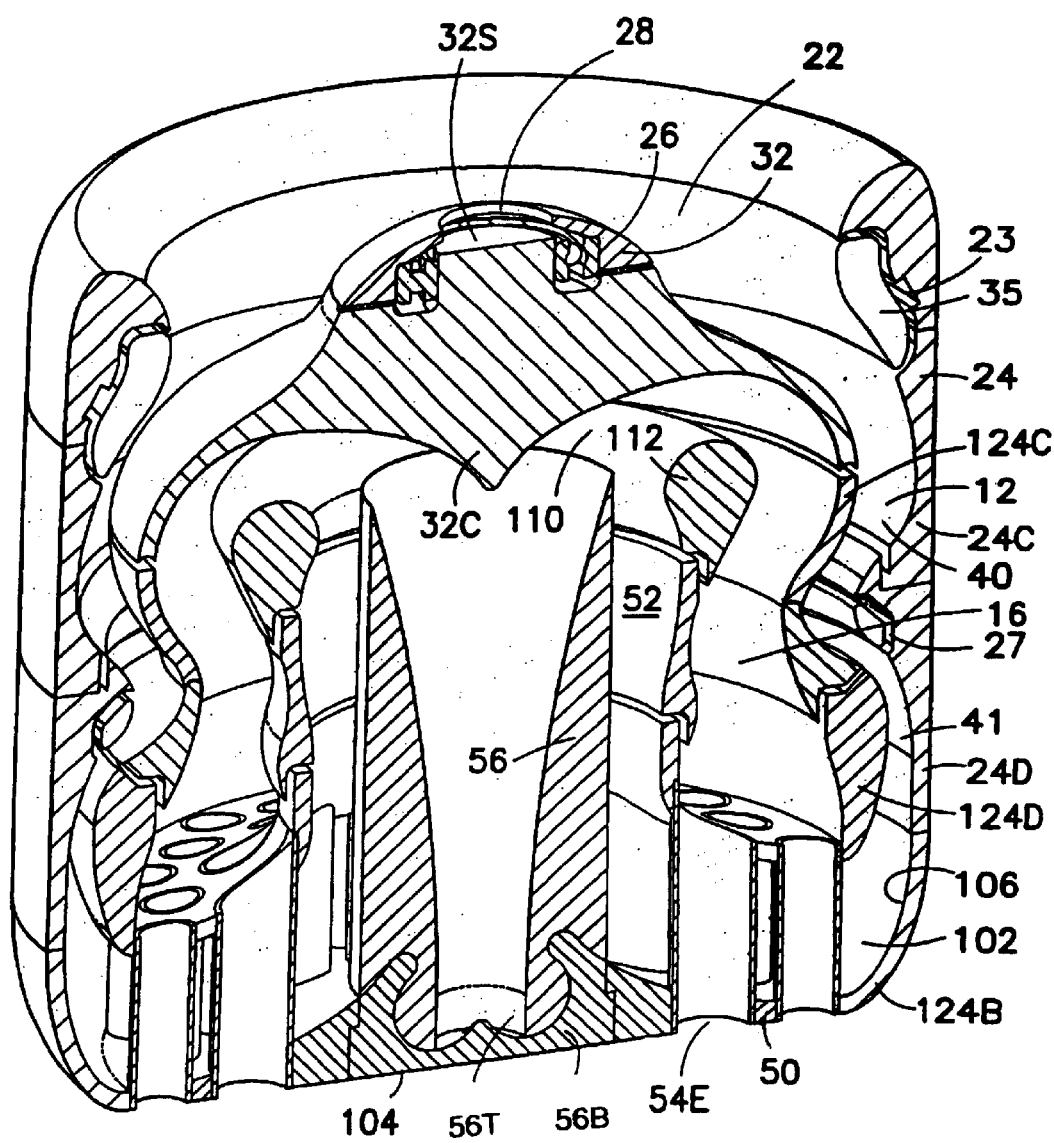

Referring to FIGS. 1–1A, there are shown respectively a cross-sectional view and cutaway perspective view of a gas turbine engine 10 incorporating features of the present invention. Although the present invention will be described with reference to the single embodiment shown in the drawings, it should be understood that the present invention can be embodied in many alternate forms of embodiments. In addition, any suitable size, shape or type of elements or materials may be used.

Referring still to FIGS. 1–1A, the gas turbine engine 10 is a nested core gas turbine engine projected to produce about 20 lbf of thrust from a 2.75" diameter, 2.75" long package. Some alternate embodiments comprising features of the present invention are shown in the engines in FIGS. 7–10, including a turbojet, a low-bypass turbofan, a high-bypass turbofan, and an ultra-high bypass (UHB) lift rotor which will be described in greater detail below.

The engine 10 shown in FIGS. 1–1A, generally has a compressor section 12, a turbine section 16, and a combustion chamber section or area 52. The compressor section 12 may include a first compressor stage 13, and a second compressor stage 14. The turbine section 16 may include first and second turbine stages 17, 18. As seen in FIGS. 1–1A, the nested core engine 10 preferably comprises an outer casing 24, a front rotor 32, a rear rotor 42, and a precombustor 50. The front rotor 32 and rear rotor 42 are rotatably mounted in series inside the outer casing 24. The precombustor 50 is located in the casing 24 to the rear of the rear rotor 42. The front rotor 32 defines at least in part the first stage 13 of the compressor section 12 as well as the first stage 17 of the turbine section 16. The rear rotor 42 defines at least in part the second stage 14 of the compressor section 12 as well as the second stage 18 of the turbine section 16. The front and rear rotor 32, 42, when mounted in the casing 24, also form the combustion chamber section 52 of the engine 10.

As can be seen from FIGS. 1–1A, the turbine section 16, is substantially nested within or surrounded by the compressor section 12 of the engine 10. In addition, the combustion chamber section 52 of the engine is nested within or substantially surrounded by the turbine section 16 of the engine 10. This concentric or coaxial and nested configuration reduces the size of the engine relative to conventional engines and can, therefore, allow for a reduction in weight.

For the preferred embodiment shown in FIGS. 1–1A, the engine 10 may be connected to a fuel source JP which supplies fuel such as JP-5 or JP-8 to an inlet 22 of the compressor section 12. For alternate embodiments, the fuel supply may be connected to any other suitable location in the engine. FIGS. 26–29 show some alternate locations for fuel injection; additional other locations may be used. The fuel mixed with inlet air is drawn through two stages 13, 14 of the compressor section 12 into the precombustor 50. The fuel and the compressed air from the compressor section is ignited in the precombustor 50. The fuel air mixture exits the precombustor 50 into the combustion chamber section 52 of the engine 10 where combustion is completed. The heated air in the combustion chamber section 52 then exits from the combustion chamber section into the surrounding turbine section 16. The heated air passes through both stages 17, 18 of the turbine section and then exhausts out of the casing. In the preferred embodiment shown in FIGS. 1–1A, the engine 10 may be provided with a starter or igniter such as for example a cartridge igniter 56 used to initiate gas and air flows through the engine as well as initiate combustion in the combustion chamber section 52 and the precombustor 50 of the engine. In the preferred embodiment, the cartridge casing burns away after the solid fuel in the cartridge burns out. In alternate embodiments, the engine may use any suitable starting system. For example, air and/or hot gases may be introduced into the engine at the location where the cartridge starter is shown to be located.

Figure 1B:
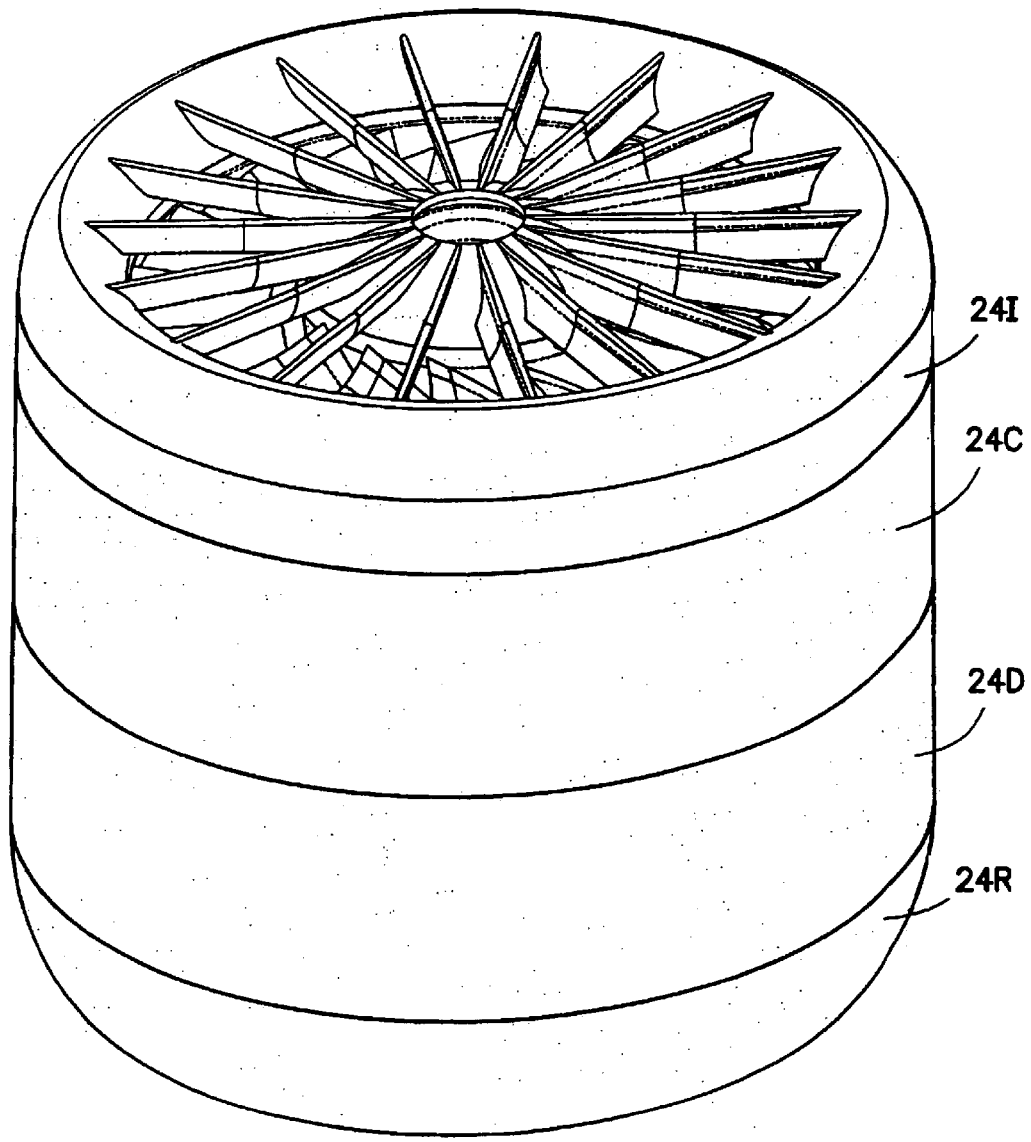
FIG. 1B is a perspective view of the gas turbine engine in FIG. 1.
Figure 1C:
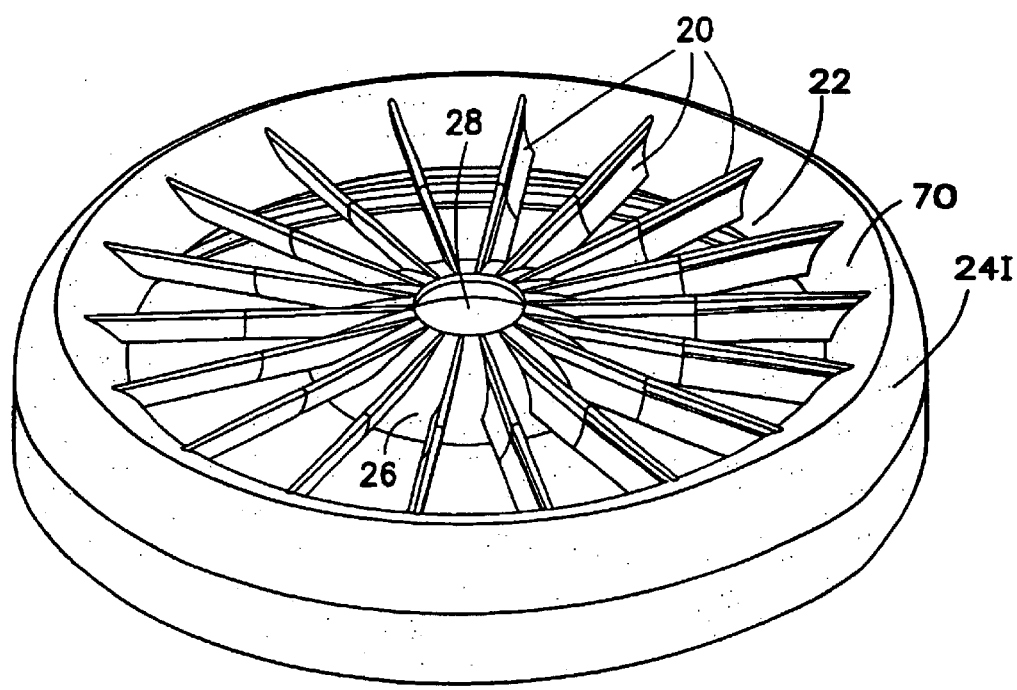
FIG. 1C is a perspective view of the front section of an outer casing of the turbine engine in FIG. 1.
Figure 1D:
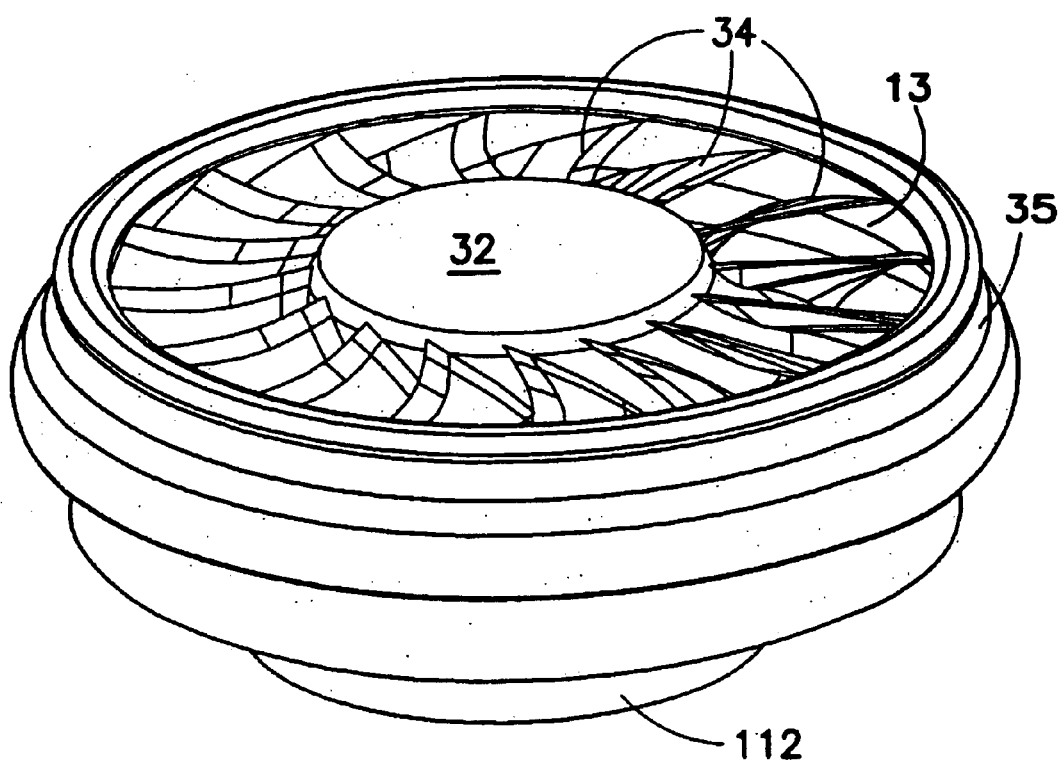
FIG. 1D is a perspective view of a front rotor of the turbine engine in FIG. 1.
Figure 1E:
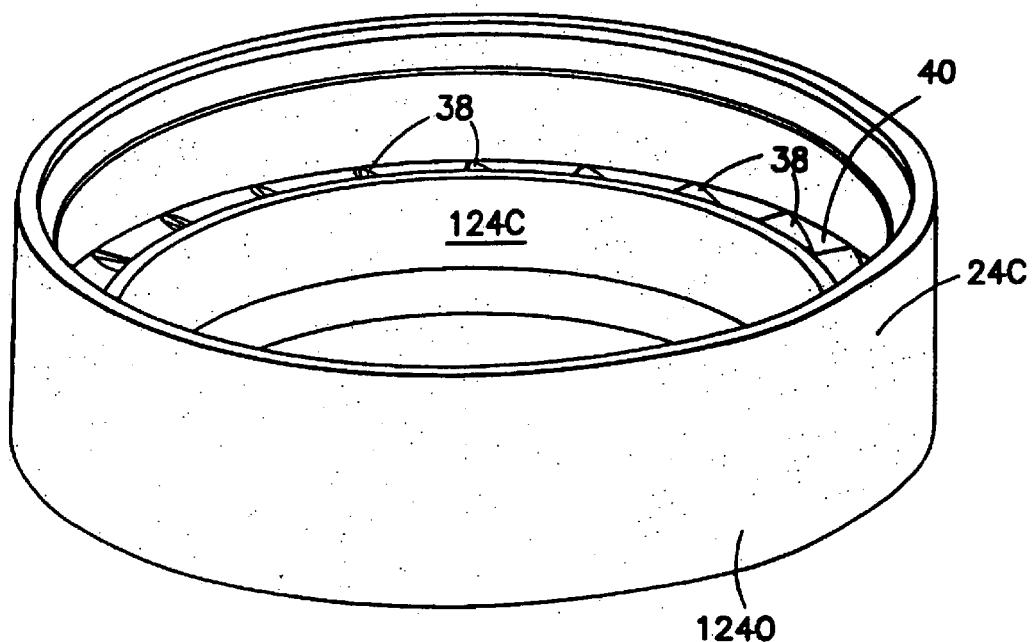
FIG. 1E is a perspective view of a stator section of the turbine engine in FIG. 1.
Figure 16:
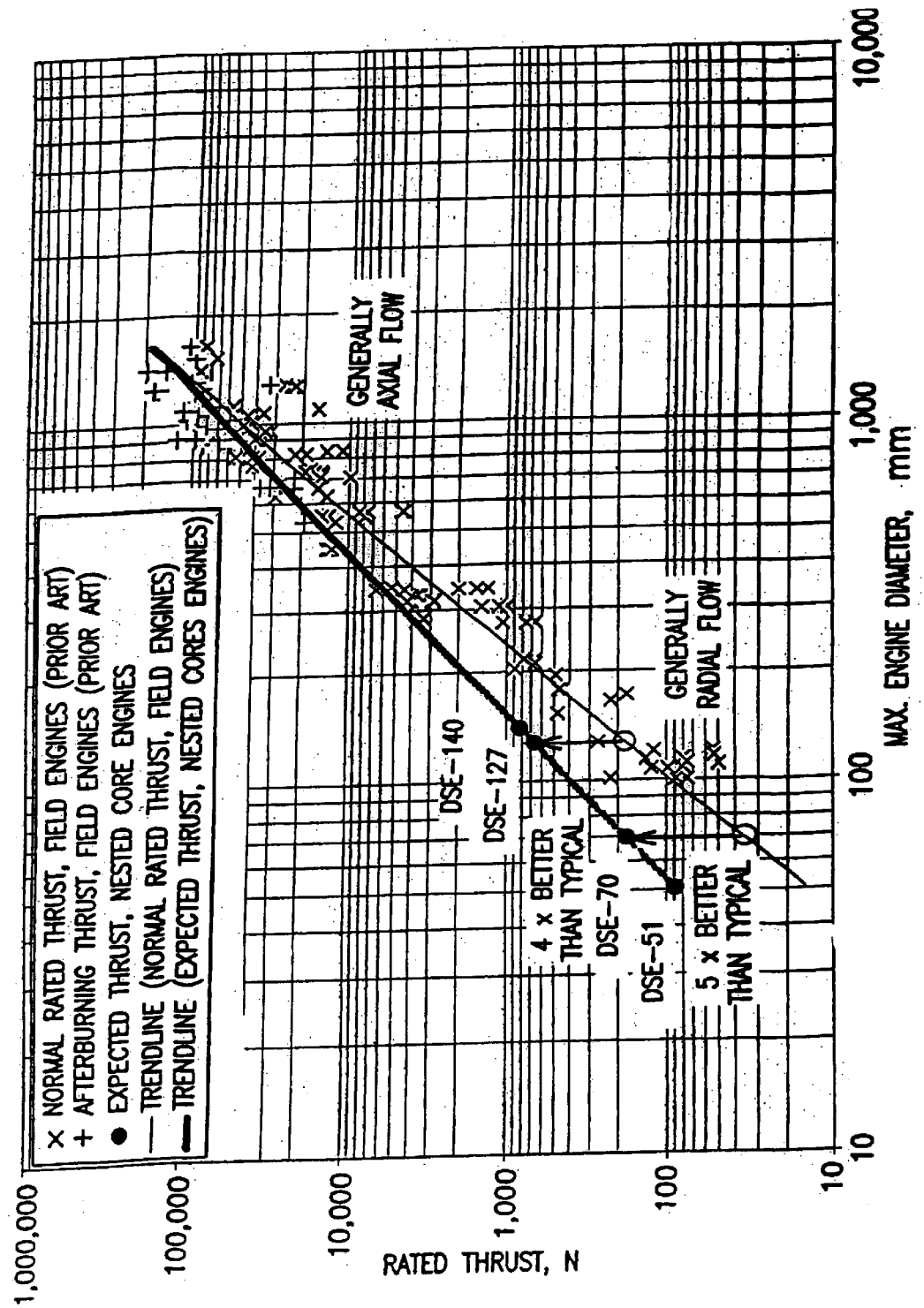
FIGS. 16–17 are graphs respectively illustrating the relationship of thrust to engine diameter and engine frontal area for field engines of the prior art and gas turbine (nested core) engines according to the present invention.
Figure 17:
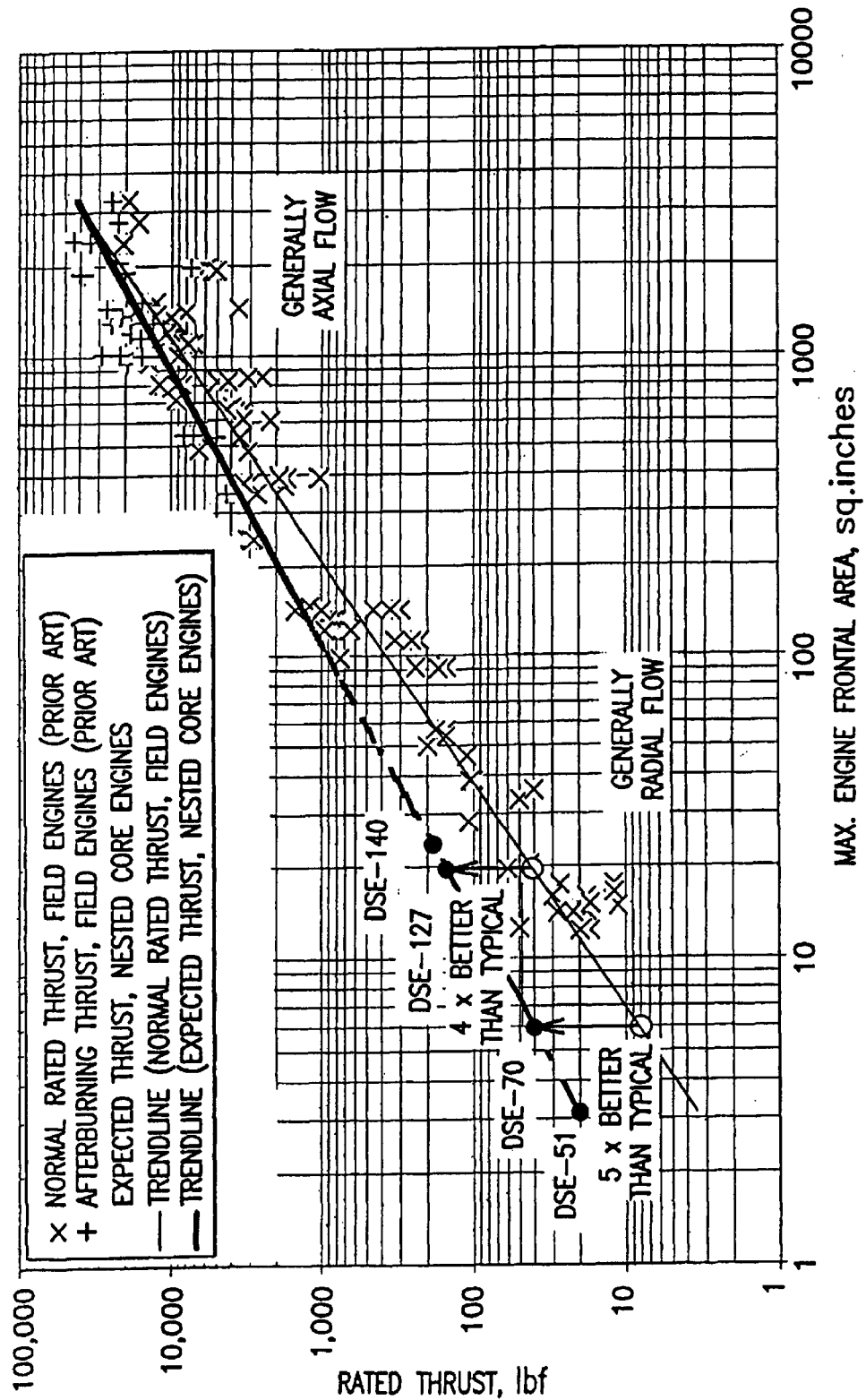
Figure 18:
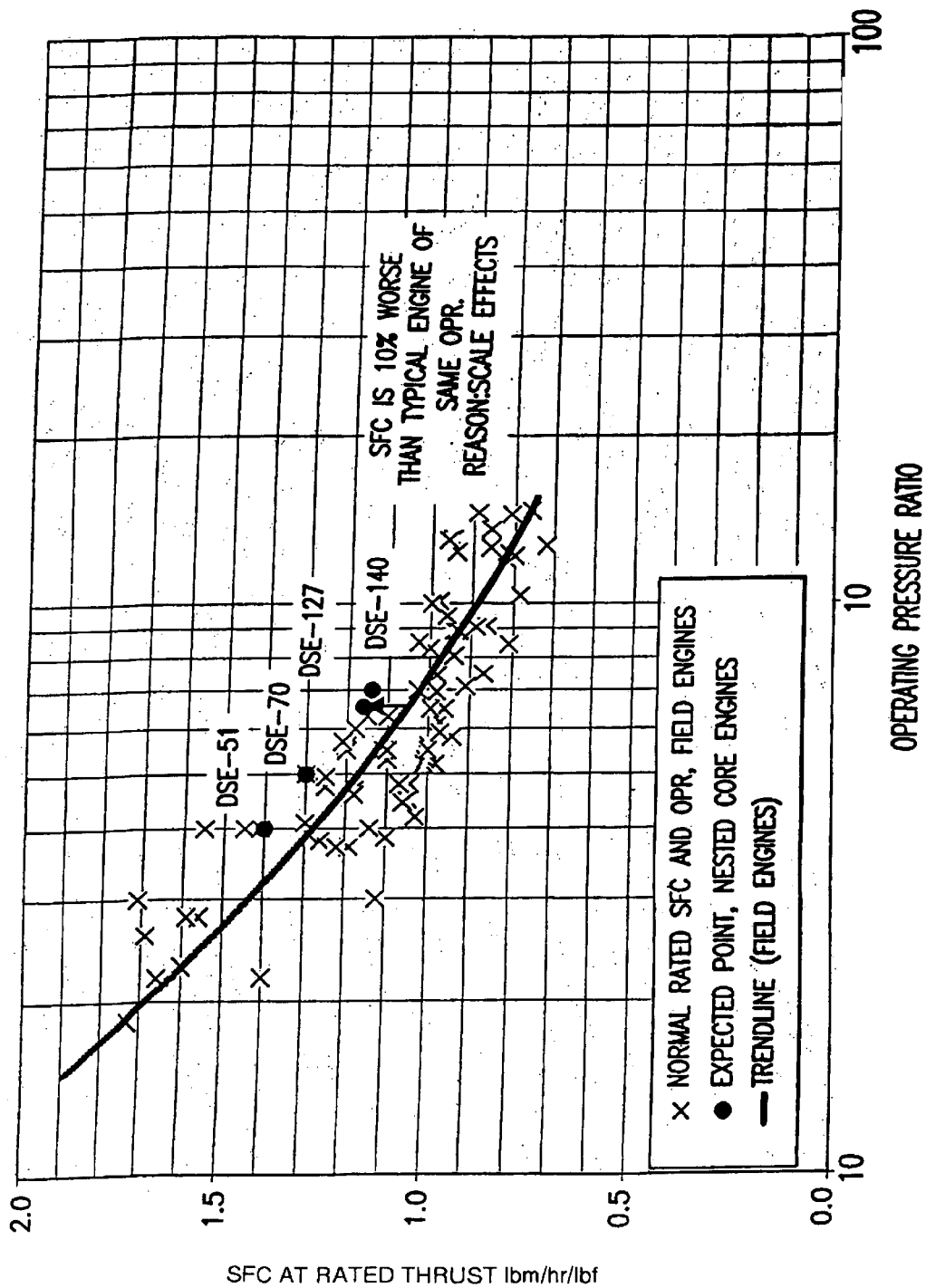
FIGS. 18–19 are graphs respectively illustrating SFC at rated thrust versus operating pressure ration (OPR), and thrust versus OPR for field engines of the prior art and gas turbine engines of the present invention.
Figure 19:
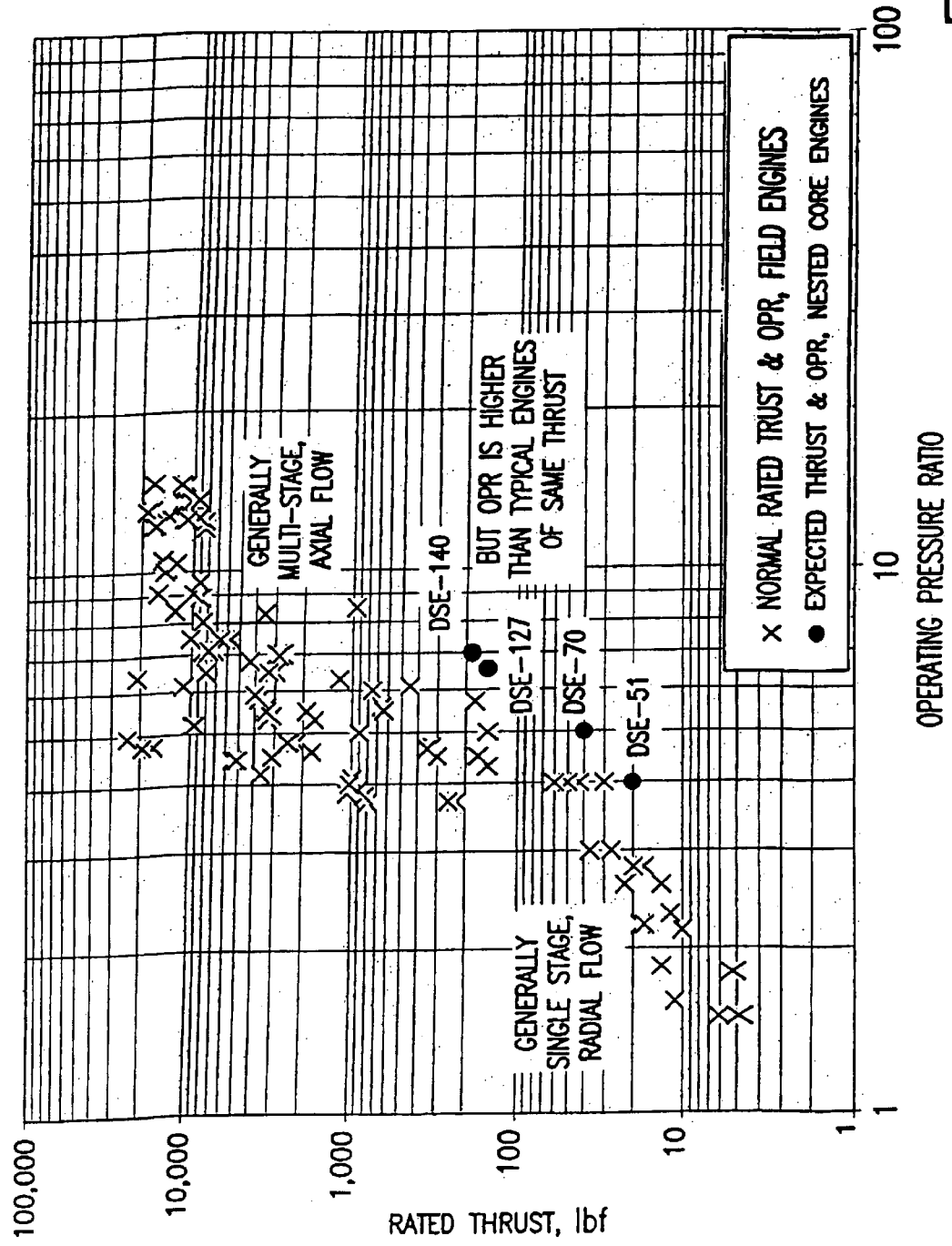
Figure 20:
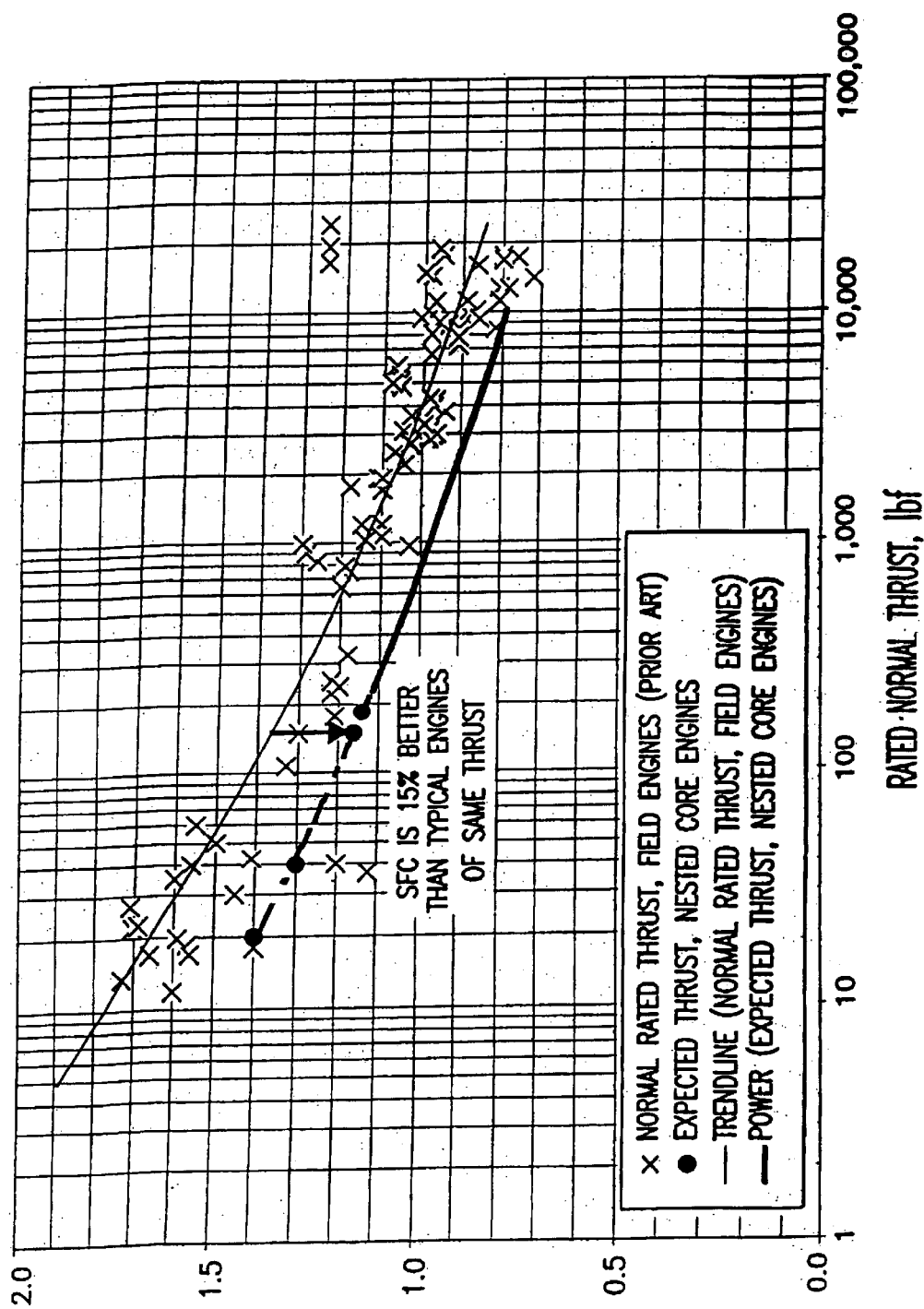
FIGS. 20–21 are graphs respectively illustrating SFC at rated thrust versus rated normal thrust, and length/diameter ratio versus engine diameter for field engines of the prior art and gas turbine engines of the present invention.
Figure 21:
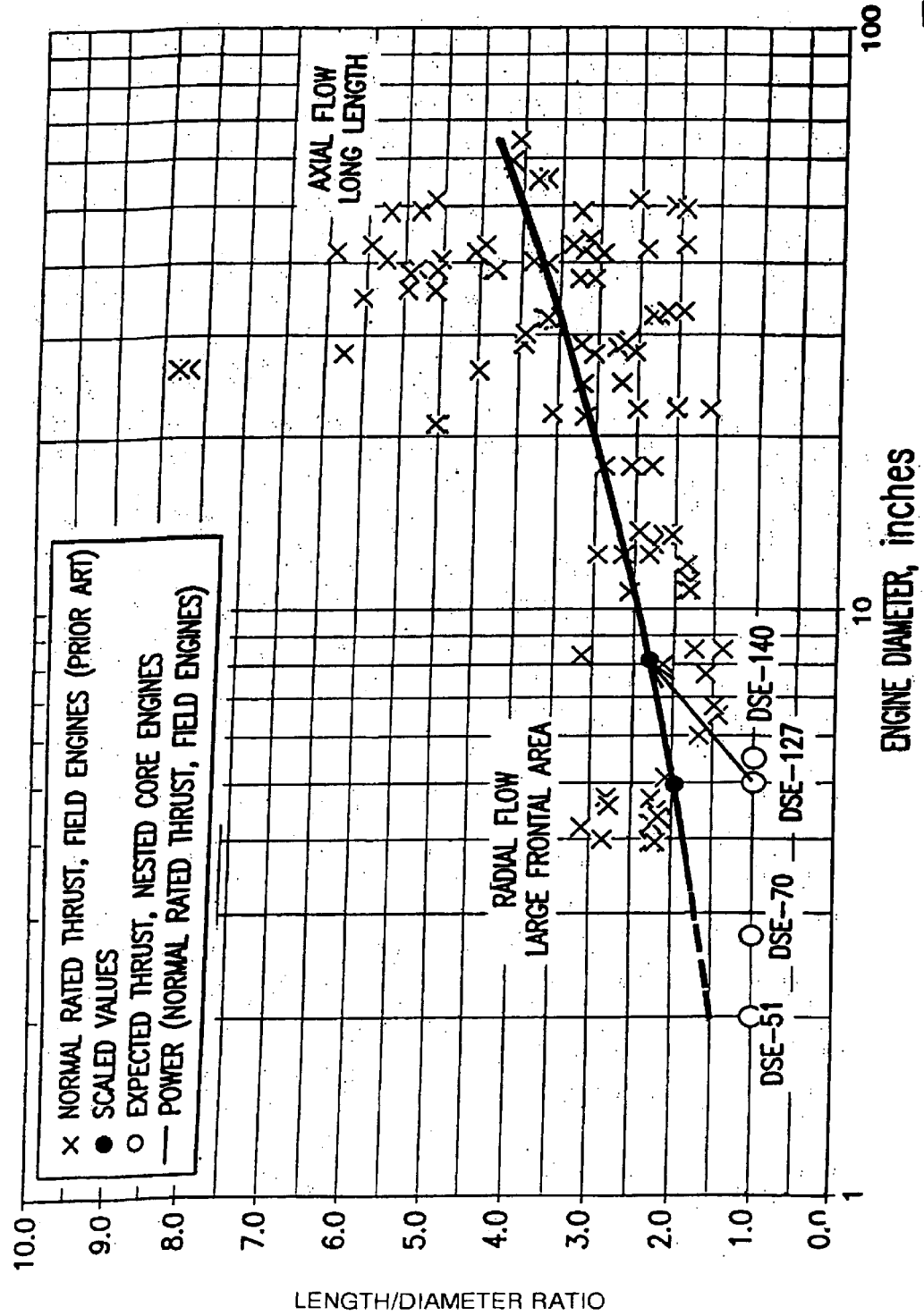
Figure 22:
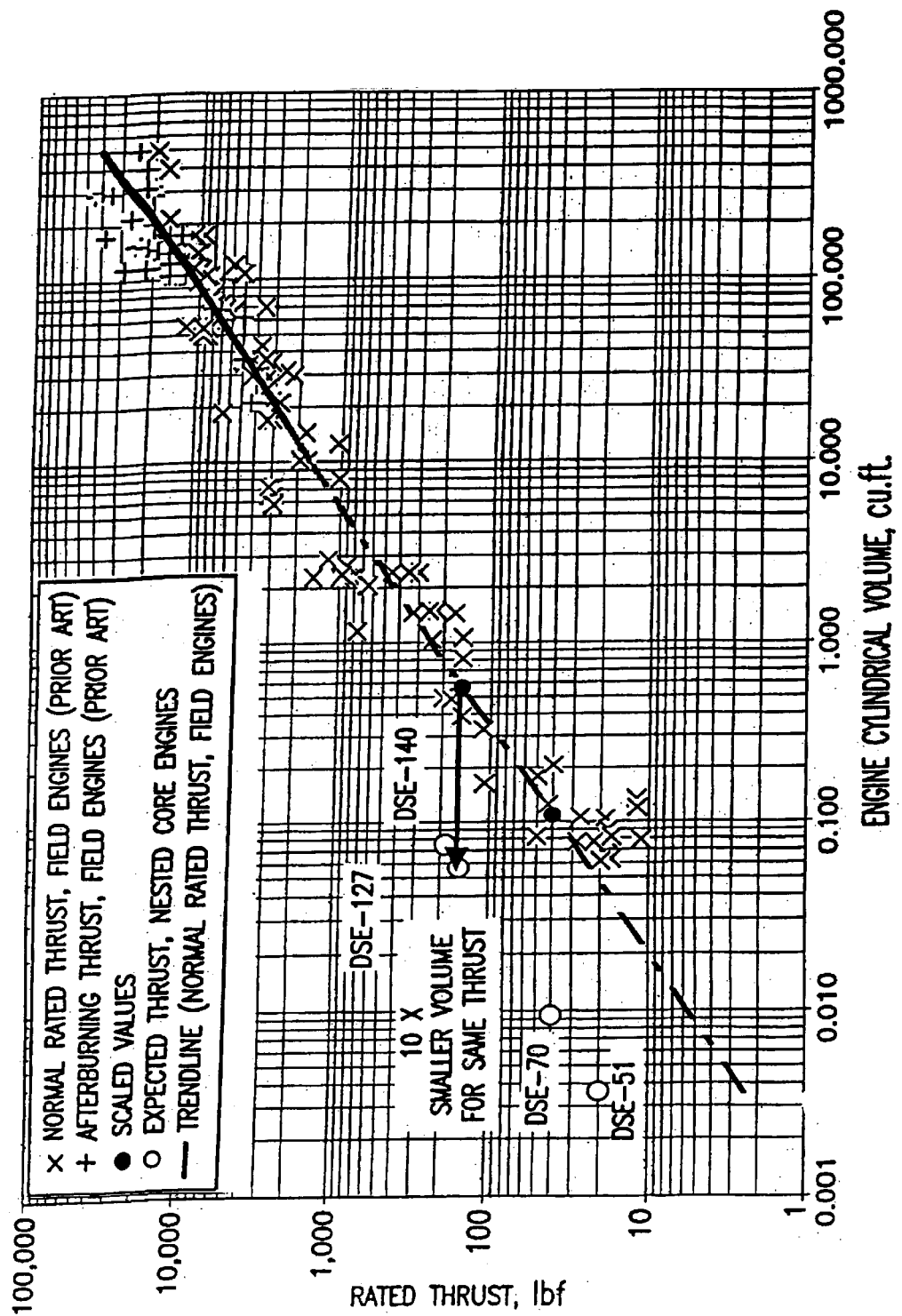
FIGS. 22–23 are graphs respectively illustrating thrust versus engine volume and bulk density (engine weight/cylindrical volume) versus engine diameter for field engines of the prior art and gas turbine engines of the present invention.
Figure 23:
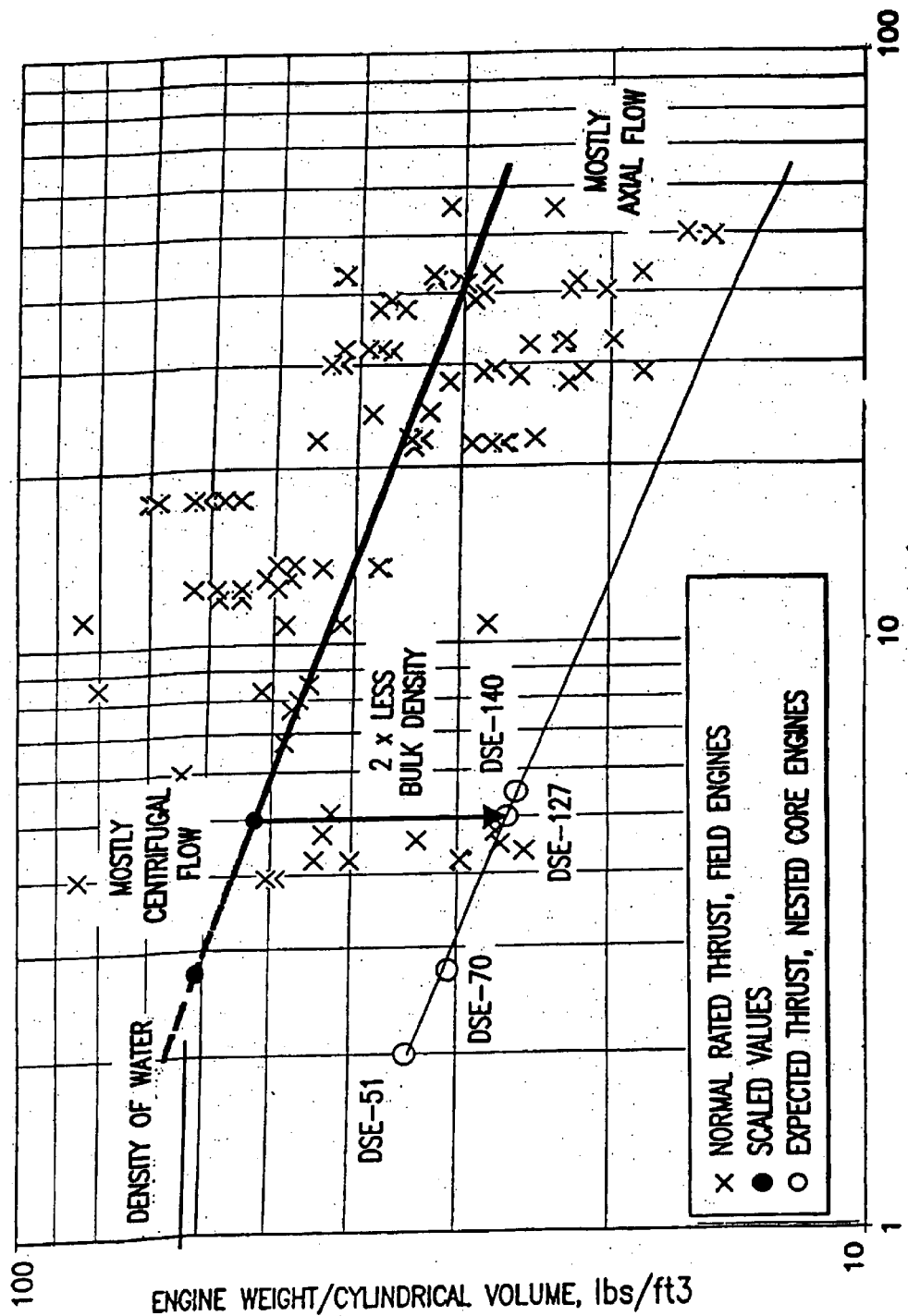
Figure 24:
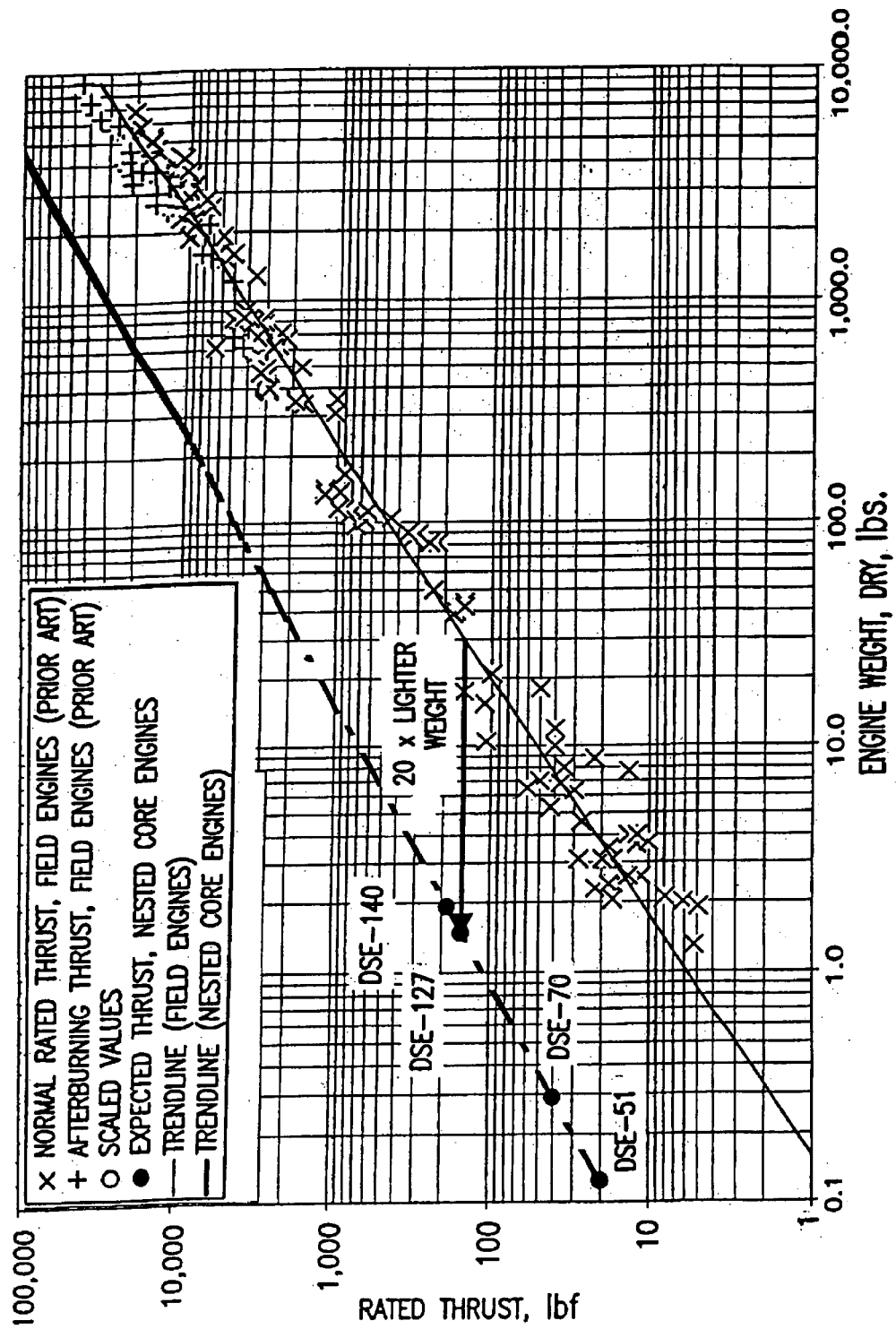
FIGS. 24–25 are graphs respectively illustrating thrust versus weight, and thrust/weight versus thrust for field engines of the prior art and gas turbine engines of the present invention.
Figure 25:
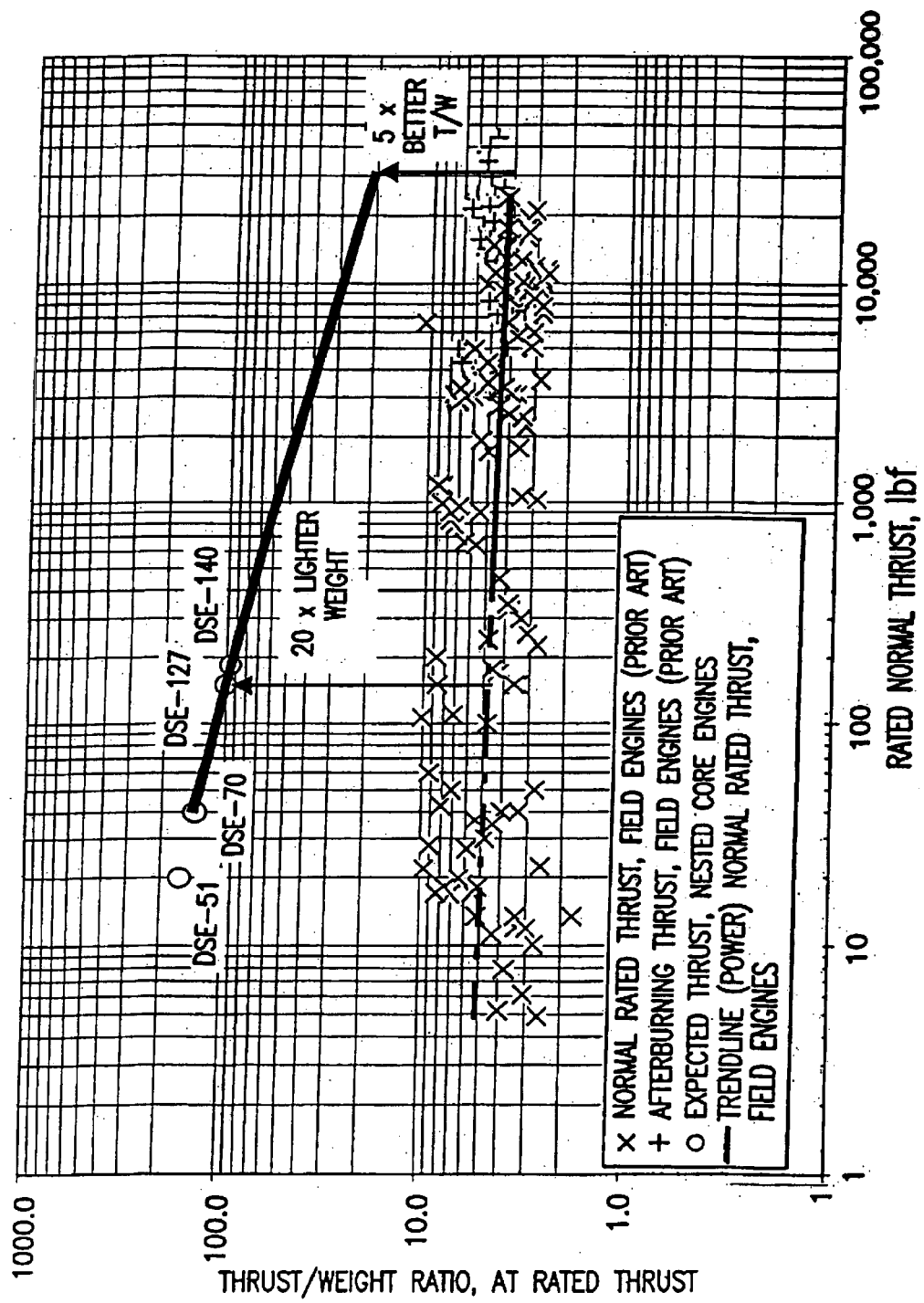
Figure 26:
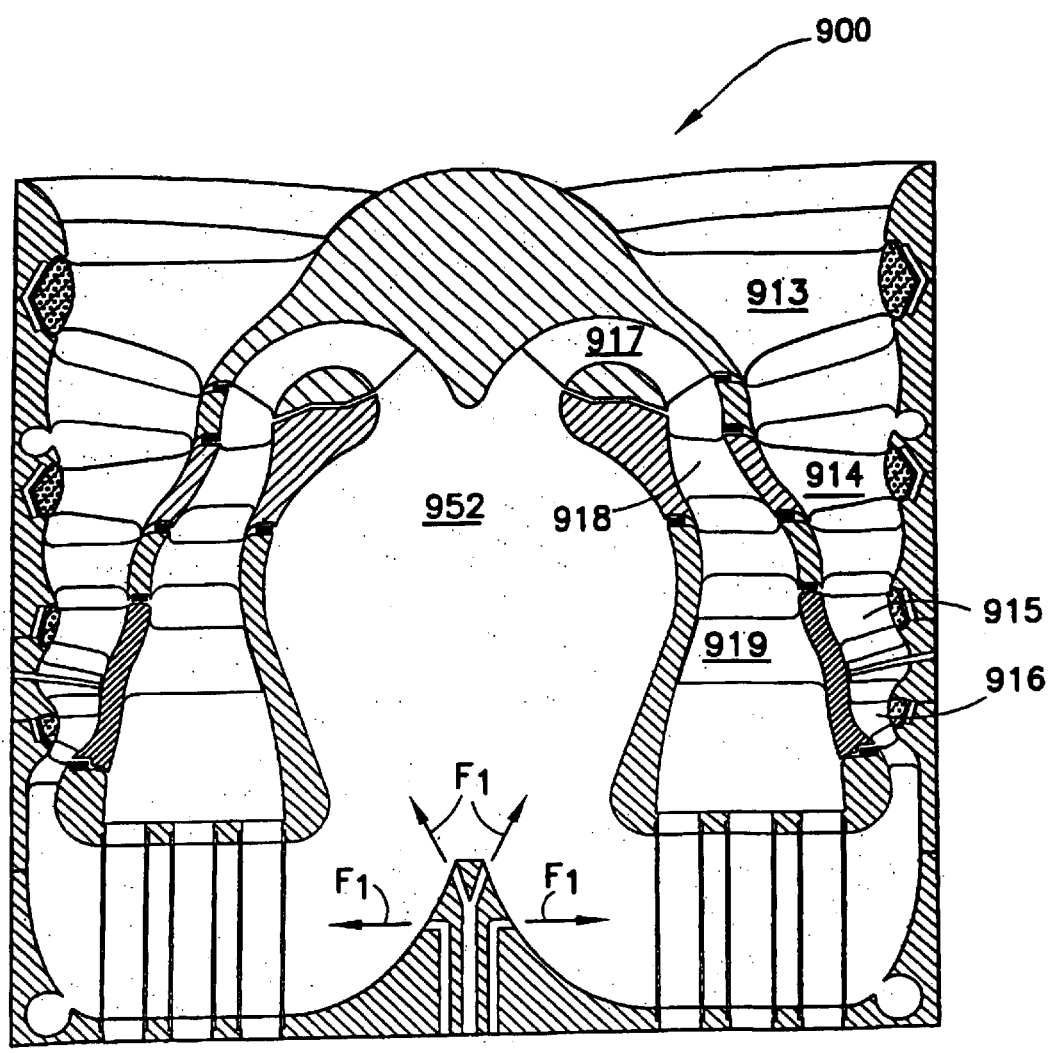
FIG. 26 is a schematic cross-sectional view of a gas turbine engine in accordance with another preferred embodiment of the present invention, particularly useful for a larger (scaled-up) engine.
Figure 27:
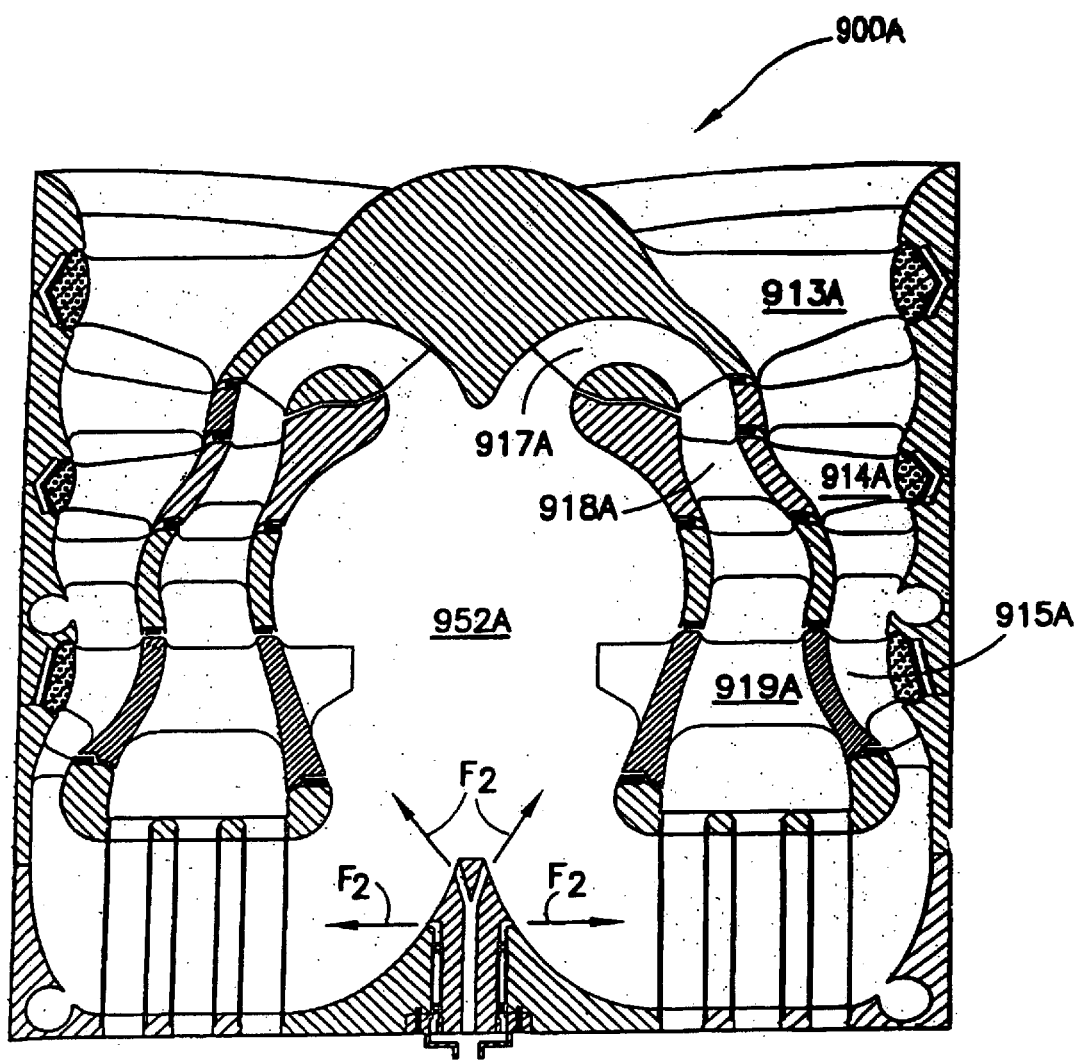
FIG. 27 is a schematic cross-sectional view of a gas turbine engine in accordance with yet another preferred embodiment of the present invention, also particularly useful for a larger (scaled-up) engine.
Figure 28:
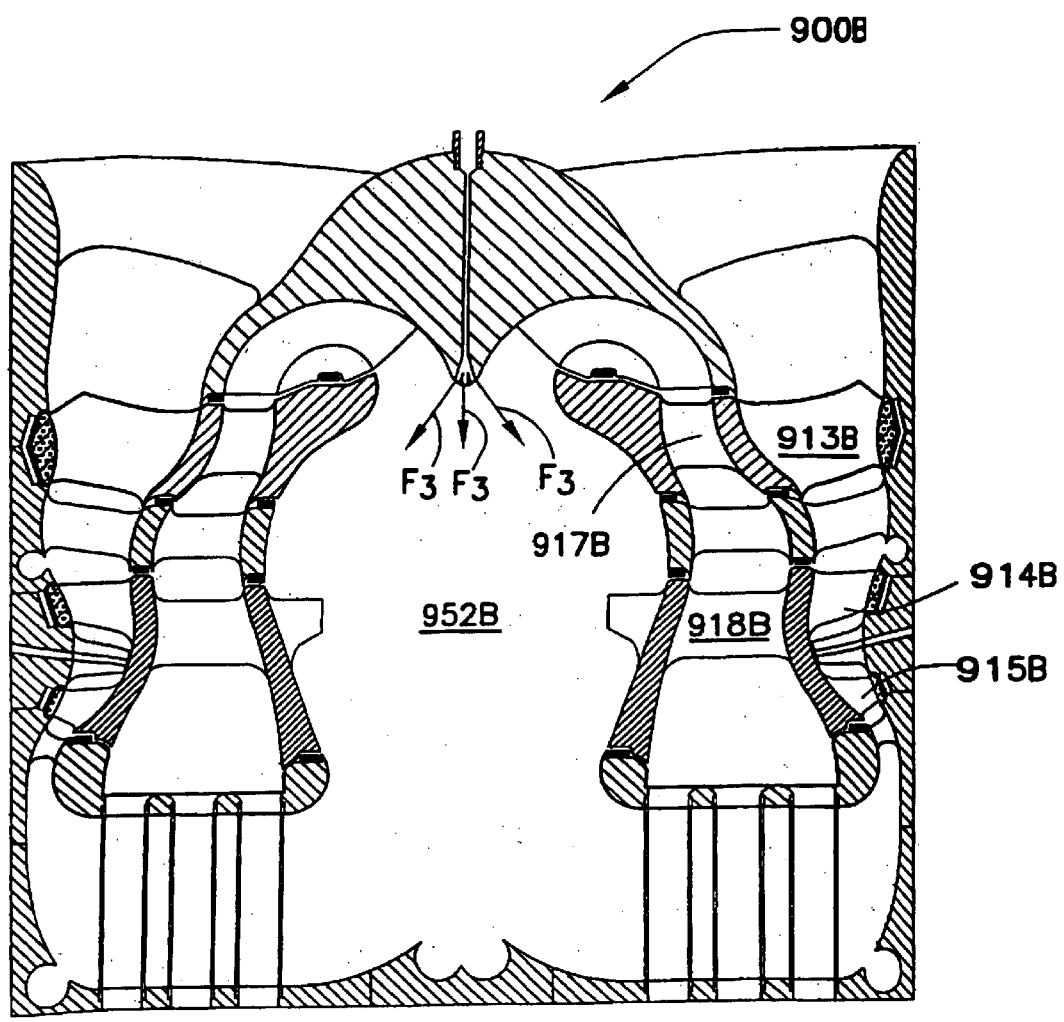
FIG. 28 is a schematic cross-sectional view of a gas turbine engine in accordance with still another preferred embodiment of the present invention, also particularly useful for a larger (scaled-up) engine.

In greater detail now, and with reference also to FIGS. 1B–1C, and 1E, the outer casing 24 is preferably made up of several sections to facilitate fabrication, though in alternate embodiments the casing may be a one piece member formed by spin casting, for example. The casing 24 may, include a front, or inlet section 24I, a first stator section 24C, a second stator section 24D, and a rear or exhaust section 24R. As seen in best in FIG. 1B, the exterior of the casing 24 is substantially cylindrical, though the casing exterior may have any other desired shape. The inlet section 24I of the casing 24, a perspective view of which is shown in FIG. 1-C, defines the inlet 22 of the gas turbine engine 10. The inlet 22 is sized to provide suitable mass flow to the engine throughout its operating range without choking. Inlet area is dependent on engine thrust. FIGS. 16–17 are graphs which relate thrust to engine diameter, and engine frontal area. As can be realized from FIGS. 16–17, the frontal area (i.e. inlet size) for a given engine thrust is less for the nested core engine 10 than for conventional small engines and comparable for large engines. This is especially the case for engines with an engine diameter under 1000 mm (i.e. under 40 inch diameter). The lip 70 of the inlet section 24I has a suitable shape to maintain substantially undisrupted flow across the entire inlet opening 22 throughout the engine operating range. In the preferred embodiment, the inlet section 24I has a center member or nose cone 26 which is supported from the outer portion of the inlet section by struts or vanes 20. Struts 20, which may be made of metal or ceramic material, are equally distributed around the inlet 22, and are provided in sufficient number to provide effective inlet protection to foreign object damage (FOD) without disrupting air flow into the inlet throughout the operating range of the engine. The FOD struts 20 may be keyed at opposite ends of the inlet section and nose cone 26 or may be attached by any other suitable means to the inlet section of the outer casing.

As seen in FIGS. 1 and 1A, the nose cone 26 is substantially a one piece member which houses a rolling element bearing 30. The nose cone 26 has a fuel port or fuel entry 28 formed at the front of the member, to which a fuel supply line JP may be connected. For example, the fuel port may be provided with a suitable fitting such as a union, which may for example be threaded into the port to which the fuel line may then be secured. The fitting may be mounted within a bearing (not shown) allowing the nose cone to rotate relative to the fuel line. In the preferred embodiment, the nose cone 26 has a bearing recess 31 formed into a rear face of the nose cone which holds the roller bearing 30. The bearing recess 31 communicates with the fuel port through conical transition section 29. The bearing rotatably holds a stub shaft member of the front rotor 32 as will be described below. The bearing 30 may have ceramic rolling elements, although other materials may be used instead.

Figure 11:
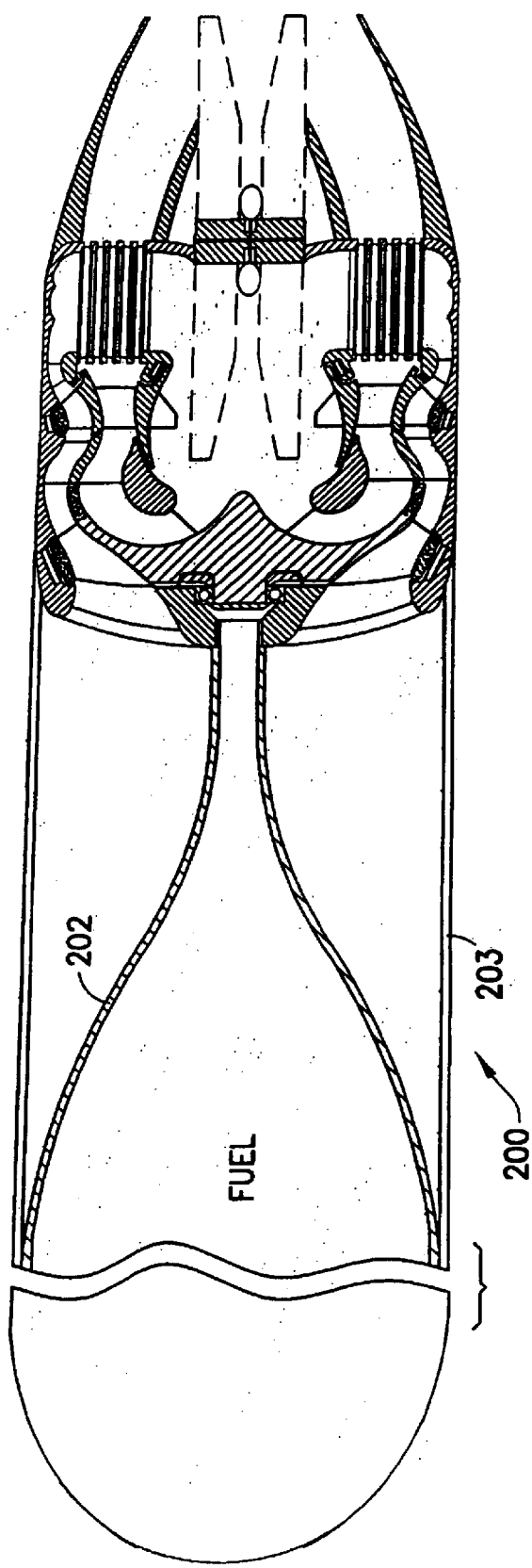
FIGS. 11–12 respectively are schematic cross-sectional views of the propulsion systems of high speed air vehicles in accordance with still other preferred embodiments of the present invention.
Figure 12:
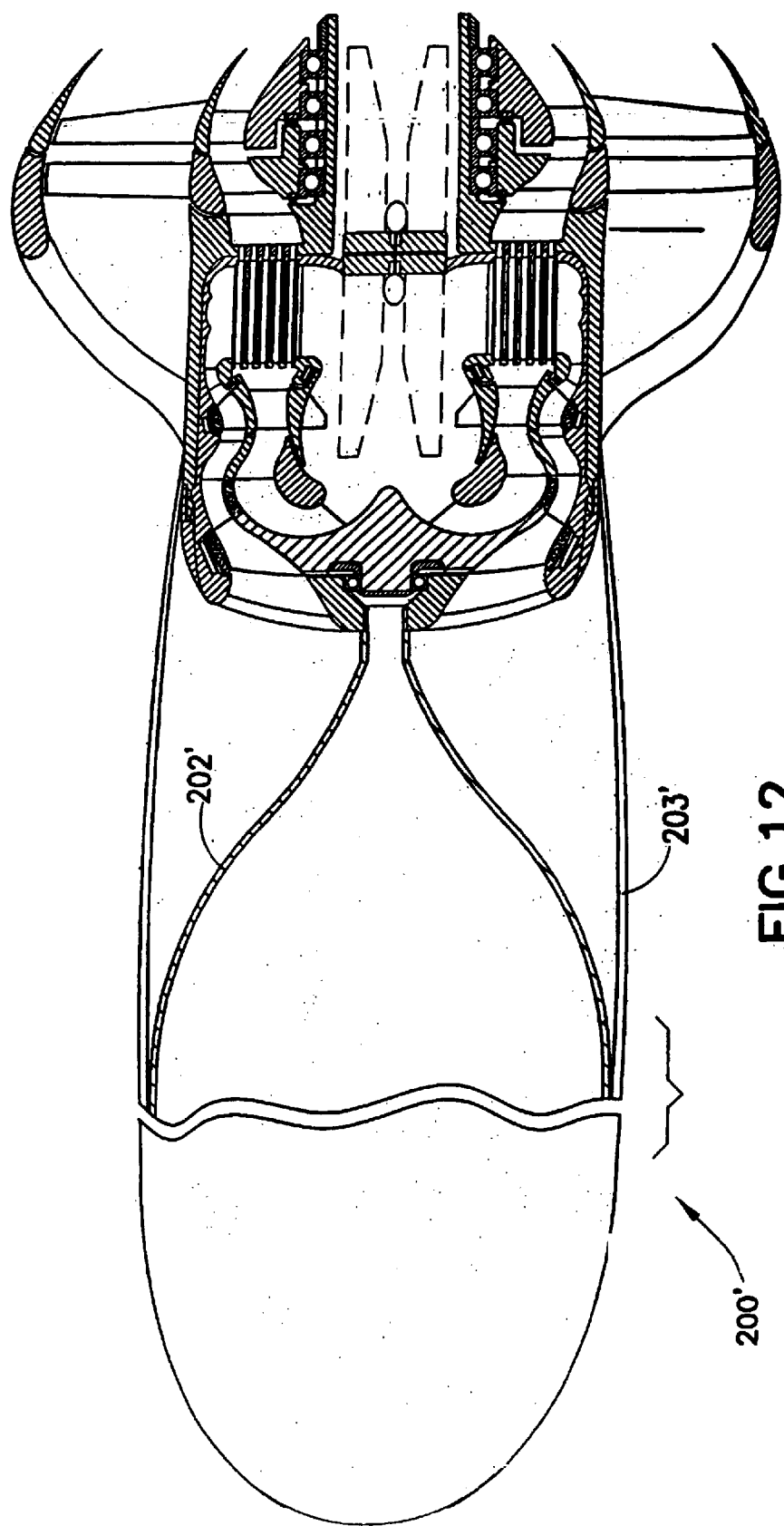

The engine may be used at the aft end of small air vehicles such as mini-cruise missiles (as shown in FIGS. 11–12) and Unmanned Aerial Vehicles (UAVs), which may have fuel tanks 202, 202' integral with the fuselage 203, 203'. Accordingly, the engine 10 preferably has a connection (such as a union) to the fuel entry 28 in the nose cone or center member 26 for coupling the fuel pipe in the shortest manner from the fuel tank 202, 202'.

From the fuel entry 28, fuel enters the region of the rolling element thrust bearing 30 for the front compressor 32, where the fuel cools the bearing and also provides a measure of lubrication to the bearing. The bearing 30 is lightly loaded because the front rotor 32 is substantially supported at the outer shroud directly from the outer casing as will be described below.

The fuel then enters radial slots on the front face of the front rotor 32, and is slung radially outward, with pressure generated by the centrifugal action of the rotor as it spins.

Still referring to FIGS. 1–1A, the inner surface of the inlet section is provided with a groove 23 which houses a suitable foil bearing 100 which supports an integral shroud 35 of the first rotor. The shroud 35 is nested in the inner portion of groove 23 as shown in FIG. 1. Also as seen in FIG. 1E, the first stator section 24C of the outer casing 24 preferably includes an outer portion 124O and an inner ring portion 124C which define compressor pathway 40. Stator vanes 38 are disposed in pathway 40 between the inner and outer portions of the first stator section 24C. The second stator section 24D of the outer casing also has an inner groove similar to groove 23 formed on the inside pathway surface of the casing. The groove 27 also houses a foil bearing 100 which supports an integral shroud 45 of the rear rotor 44. As seen in FIG. 1, the shroud 45 is nested within an inner portion of groove 27. In the preferred embodiment, the second stator section may also include an inner ring portion 124D which defines compressor pathway 41 (See FIG. 1A). Stator vanes 39 are disposed in the pathway 41 between the inner portion and outer portion of the second stator section of the casing.

Figure 1F:
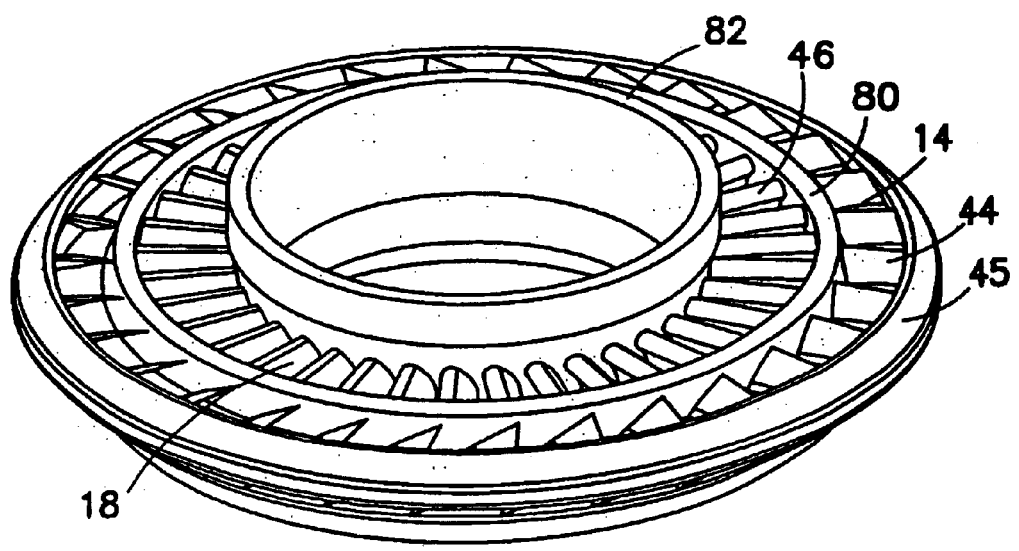
FIG. 1F is a perspective view of a rear rotor of the turbine engine in FIG. 1.
Figure 1G:
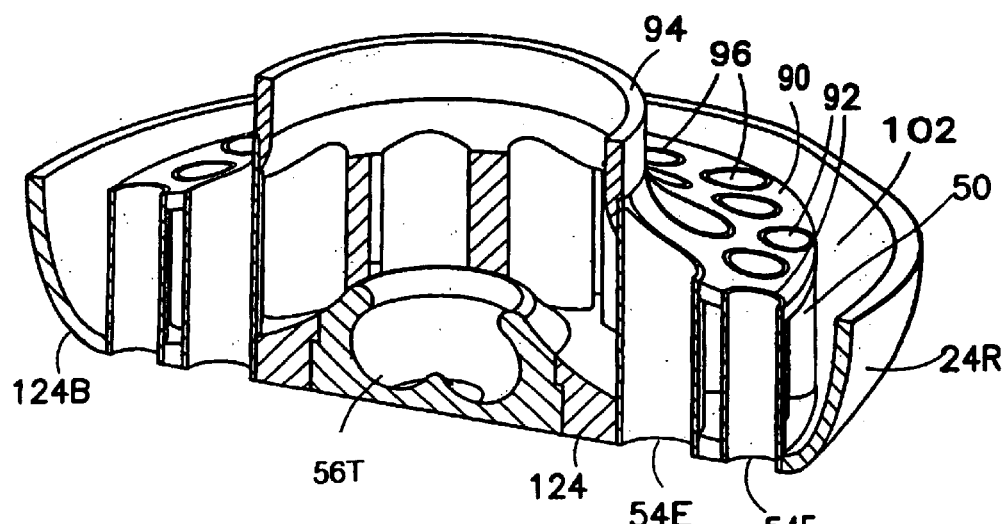
FIG. 1G is a perspective cut-away view of a rear end portion of the turbine engine in FIG. 1.
Figure 2A:
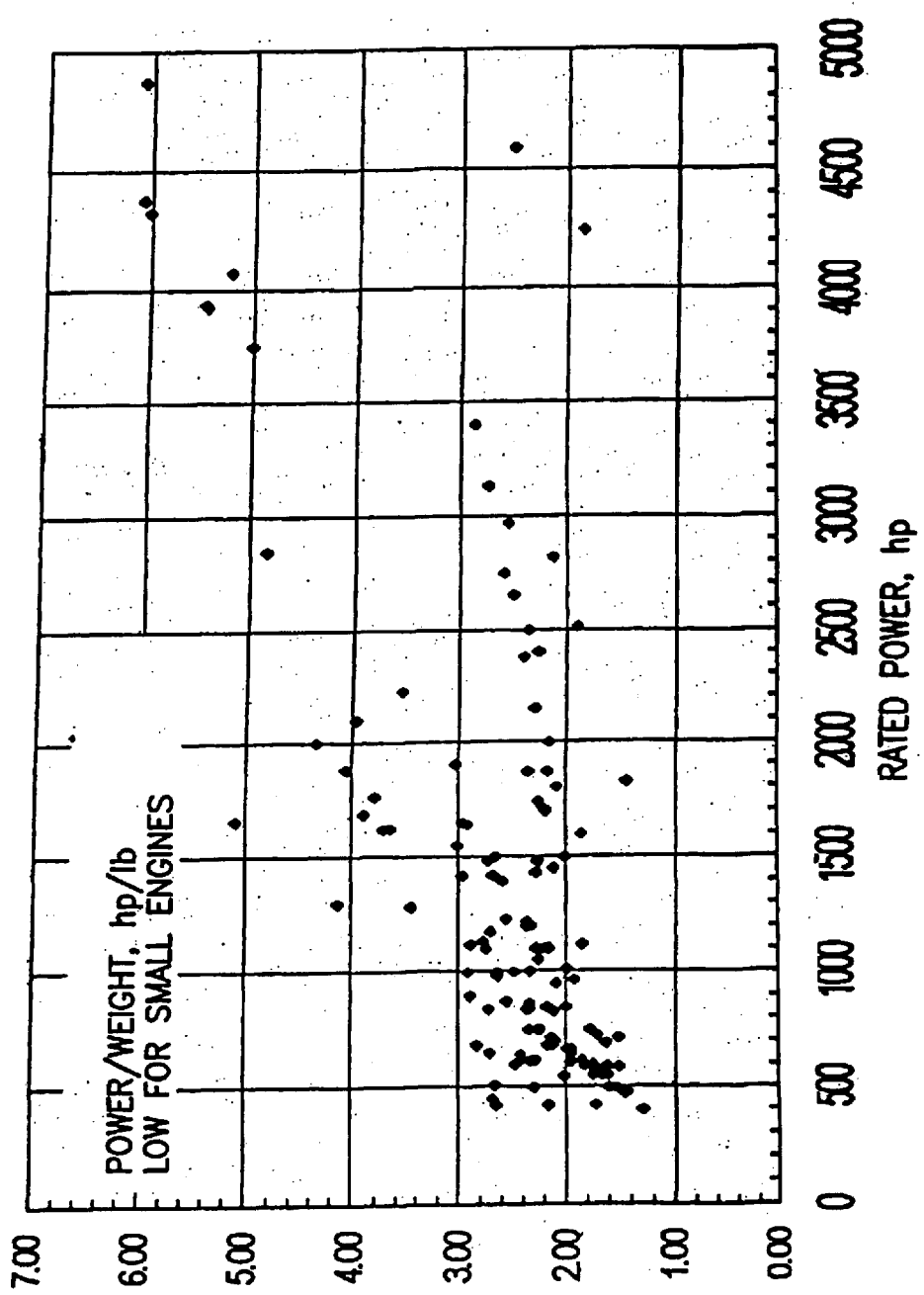
FIGS. 2A–2B are graphs respectively illustrating power/weight ratios versus rated power, and specific fuel consumption (SFC) versus rated power for small engines of the prior art.
Figure 2B:
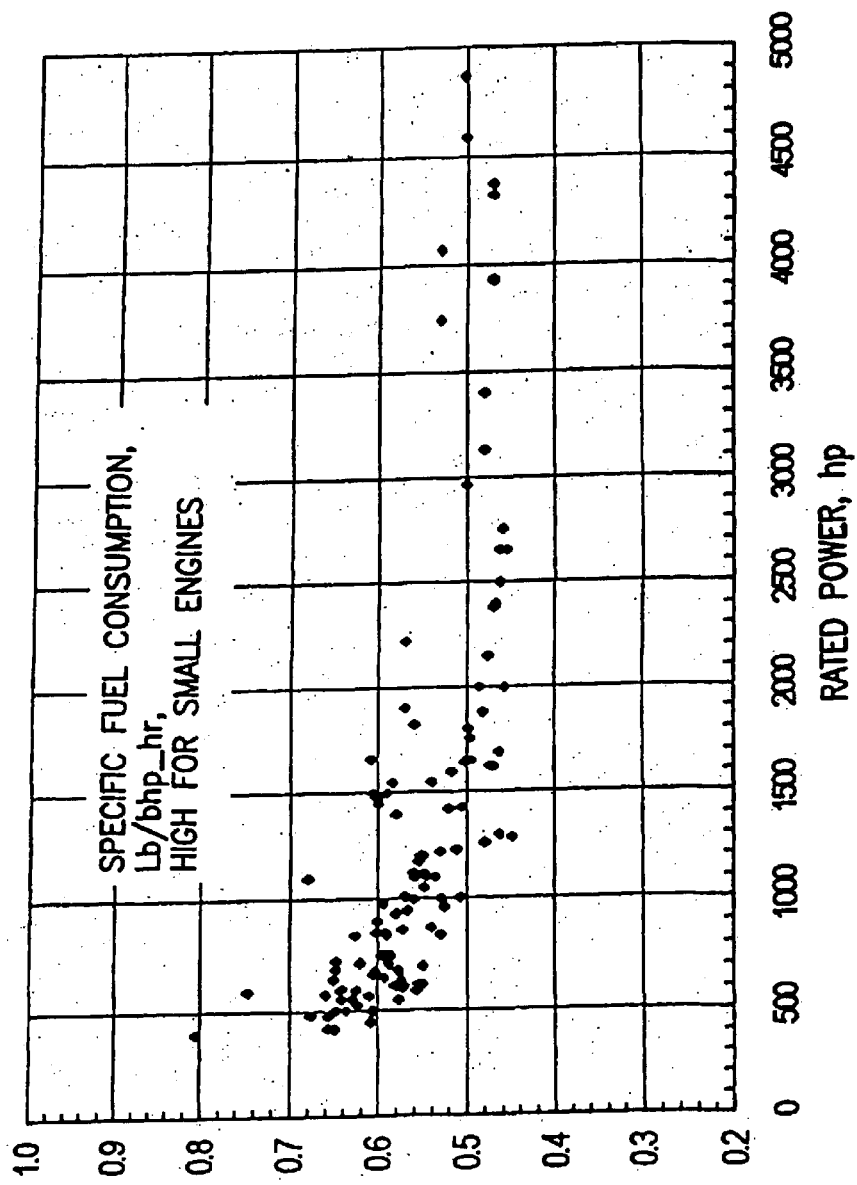

Referring now also to FIG. 1G, the exhaust section 24R of the outer casing 24 defines a cross-over passage 102 which holds the precombustor 50 therein. The rear or bottom end 54 of the exhaust section 24R is substantially closed by plate member, or an integral rear member 124B except for a hole 104 for cartridge igniter 56, and exhaust passages or outlets 54E formed into the rear member 124B. As can be seen in FIG. 1G, the igniter hole is essentially centered and may be threaded in order to allow the cartridge igniter 56 to be threadably mounted into the igniter hole 104. The exhaust passages 54E are suitably sized to allow movement of the exhaust gases from the engine throughout the operating range of the engine, and are distributed circumferentially around the rear member 124B of the outer casing. The precombustor 50 may be mounted to the outer member 124B of the casing 24 as will be described in greater detail below. As shown in FIGS. 1–1A, the inner surface 106 of the exhaust section 24R is suitably shaped to provide the cross-over passage 102 with an outer transition for distributing flow of compressor gas exiting the compressor pathway 41 substantially evenly across the height of the cross-over passage 102.

Referring now to FIGS. 1–1A and 1D, the front rotor 32 generally comprises center section 32C, compressor blades 34, turbine blades 36, inner turbine ring 112, and outer filament-wound shroud 35. The center section preferably has a general bell-shape which defines an annular plenum 110 at the rear face of the center section. The rear face of the center section has a center diverging cone 108 as shown in FIGS. 1–1A. The front of the center section 32 has a stub shaft 32S. The shaft 32S is sized to be a rotatably mounted to the bearing 30 in the nose cone 26 as shown in FIGS. 1–1A. The front of the center section also includes fuel slots or passages 33. The fuel slots 33 extend substantially radially outwards from the stub shaft. In alternate embodiments the fuel passages may be through bores in the center section. Each fuel slot has an entry port substantially aligned with bearing 30 when the rotor is mounted to the nose cone. The exit end of the fuel slot 33 is at the root of the compressor blades 34 on the front rotor 32. When the front rotor is mounted to the casing, the front face of the rotor center section 32C makes a seal with the rear face of the nose cone 26 (see FIG. 1) so that fuel flowing through the slots 33 flows within the slots without substantially spilling over the radial edges of the slots. The center section may be made of any suitable heat resistant and insulating material such as carbon/carbon composite or ceramic. The lower edge of the center section 32C may include a filament wound portion or band that supports the compressor and/or turbine blades by hoop tension. The reinforcing filaments, 114, may be made of any suitable reinforcement material, such as carbon or alumina/silica fibers. The filaments also enable application of a hoop prestress to the filament wound portion of the center section 32C. The compressor blades 34 are mounted to the outside of the center section 32C. The compressor blades 34 on the front rotor 32 form a first compressor stage 13 of the nested core engine 10.

The engine 10 preferably uses a mixed-flow first compressor stage 13 with a pressure ratio in the range of 2.5:1 to 3:1, using a rotor tip speed in the range of about 465 to 515 m/sec (1525 to 1690 ft/sec). The isentropic work coefficient is about 0.40, considered reasonable for the mixed-flow compressor.

Efficiency of the compressor stage 13 is enhanced by having reduced axial flow velocity, and long blade chords. Conventional axial-flow gas turbine engines are generally designed for fighter aircraft, and then scaled down if needed to the small sizes. However, this is not optimal for the small engines, because fighter engines are designed to maximize air flow swallowing capacity. This causes them to have high axial flow velocity, and the blades then need to have short chords for short axial length. When these blades are scaled down, the blade chords are too short for efficiency (Reynolds Number effects, blade thickness/chord ratios for manufacturability, blade relative roughness ratios, etc.).

The engine 10 preferably has reduced axial velocity, and thus compressor blades 34 may have long blade chords, to retain aerodynamic efficiency. A side effect of this change is to reduce the flow diffusion angle between the blades 34, resulting in reduced flow separation, greater diffusion efficiency, higher pressure rise per stage as well as greater stage efficiency in comparison to conventional engines. Also, the long-chord blades 34 can be thicker and stronger, and hence impart a measure of FOD-resistance against the smaller insects and debris that gets through the anti-FOD vanes at the front of the outer casing. The compressor blades preferably have titanium leading edge covers/coatings (not shown) for extra FOD-resistance.

The filament-wound outer shroud 35 is preferably a one-piece member that encloses the compressor section of rotor 32, and provides great hoop strength against the radial centrifugal loads on the blades 34. The reinforcement filaments or fibers are similar to reinforcement fibers 114 in the outer edge of the center section 32C, and may be made of any suitable material. The filaments in the outer shroud 35 may be pretensioned generating a pre-load in the outer shroud thereby placing the compressor blades 34 in axial compression. This reduces the tensile and bending loads on the compressor blades 34 during engine operation, easing the structural requirements of the blades. Also, because the blades 34 are shrouded, the long-chord blades avoid the large tip-vortex losses associated with conventional small compressors.

The outer shroud 35 is sized to be conformal to groove 23 in the inlet section 24I (See FIG. 1B) of the outer casing. The shroud has an outer seating surface which is configured to rotatably seat against the foil bearing 100 located in the groove 23 of the inlet section 24I (see FIG. 1B). Minor leakage of air may occur between the rotating shroud 35 and the stationary engine casing 24. Seals (not shown) may be provided between the outer shroud of the front rotor 32 and the outer casing to control air leakage as desired. In comparison to conventional engines, it is much easier to seal the continuous surface of the shroud 35 than it is to ensure very tight running clearances, despite engine transients, around the tips of individual blades in the compressor sections of conventional gas turbines. Air leakage between shroud 35 and casing 24 may be used for providing air for self-pressurizing and cooling the foil air bearings 100, discussed below, that support the engine rotor 32. The foil bearings 100 support the front rotor 32 against both radial and forward axial loads. Accordingly, the roller bearing on the stub shaft of the front rotor 32 is lightly loaded, providing support for aftward axial loads that are normally of a smaller magnitude and/or transient in nature, and allows the front rotor 32 to operate substantially as a shaftless rotor.

Turbine blades 36 are located on the inside of the center section 32C. In particular the blades 36 are disposed as shown in FIG. 1, inside the annular plenum 110 at the rear face of the center section. The inner turbine ring 112 is located generally in the annular plenum 110 of the center section 32 as shown in FIG. 1. The turbine blade tips are connected to the inner turbine ring 112. The front edge of the inner turbine ring 112 is suitably rounded to form, in combination with the diverging center cone 108 of the center section, an annular turbine nozzle as shown in FIG. 1 for the turbine section of the front rotor 32. The front rotor thus includes an integral compressor section and an integral turbine section. During engine operation the outer compressor section is the cold section of the rotor through which cold compressor air flows, and the inner turbine section is the hot section of the front rotor through which hot combustion gases flow.

Thus, the front compressor rotor 32 has an integrated rotating-nozzle turbine which is the first turbine stage 17 of the engine 10, as shown in the FIGS. 1–1A. This integration eliminates the back-face disk pumping losses for both the compressor and the turbine, and also eliminates the critical speed problems of high-speed shafts. Heat transfer through the common interface is reduced by use of ceramic construction, at least in the center section 32C of the front rotor 32, that has lower conductivity than typical metals. The unique rotatable nozzle first turbine stage 17 preferably has no stationary nozzles. It bakes in hot combustion gases at low relative velocity, turns and expands the gases, and ejects the gases at high relative velocity for tangential thrust (torque) to drive the first compressor stage 13. The turbine 17 is expected to have competitive efficiency at somewhat lower work coefficient than conventional turbines, and offers a very significant benefit of immunity to the thermal pattern factors of conventional combustors. For the same material temperature limitation, this can allow a significant increase in peak cycle temperature in turbine 17. The turbine nozzle 17 can also be un-cooled, due to ceramic construction and absence of Pattern Factor effects, for significant savings in cost compared to conventional engines with cooled turbines.

Referring now to FIGS. 1–1A, and 1F, the rear rotor 42 (a perspective view of which is shown in FIG. 1F) of engine 10 generally comprises middle ring 80, compressor blades 44, turbine blades 46, inter turbine ring 82, and outer shroud 45. As seen in FIGS. 1–1A, in the preferred embodiment, the rear rotor 42 also has turbulator blades 48 (the turbulator blades are not shown in FIG. 1F for clarity). The compressor blades 44 are attached substantially radially outward from the middle ring 80. The outer shroud 45 extends around the tips of the compressor blades 44. The compressor blade tips are anchored to the shroud 45. The center ring is preferable a one-piece member made of ceramic or any other heat resistant/insulative material. The outer surface of the middle ring 80, and the inner side of the shroud 45 are suitably shaped to form an appropriate compressor passage for air emerging from pathway 40 and the first stator section 24C of the outer casing (see FIGS. 1–1A). The second compressor stage 14 of the engine is provided by the compressor section (i.e. the middle ring 80, compression blades 44, and outer shroud 45) of the rear rotor 42.

Similar to the first stage 13, the second stage compressor 14 is also a mixed-flow device, with reduced flow angles and long-chord blades 44. Independent spools for two compressors (i.e. front rotor 32 for the first stage, and rear rotor 42 for the second stage) offer better off-design matching and greater resistance to blade stalls. The compressor blades 44 may have titanium leading edge covers/coatings for extra FOD-resistance similar to blades 34 of the first compressor stage.

The second compressor stage 18 may preferably employ a pressure ratio in the range of 2.0:1 to 2.5:1, using a rotor tip speed in the range of about 470 to 560 m/sec (1540 to 1840 ft/sec). The isentropic work coefficient may be about 0.40, considered reasonable for a mixed-flow compressor.

Shroud 45 is generally similar to shroud 35 of the front rotor 32. The shroud 45 may be a one piece filament-wound member with reinforcing filaments or fibers substantially similar to reinforcing fibers 114 in shroud 35. The shroud may be pre-stressed to maintain the compressor blades in compression. The shroud is sized to conform to the receiving groove 27 in section 24D of the outer casing as shown in FIG. 1. Seals (not shown) may be provided to seal air gaps between the shroud 45 and groove walls. The outer surface of the shroud is configured to seat against foil bearings 100 in groove 27. Foil bearings 100 are only one of two foil bearings used to support the rear rotor 42 axially and radially (bearing 100' supports the inner turbine ring as will be described below. Air leakage between the shroud 45 and groove 27 during the engine operation supplies air to foil bearing 100. As seen in FIGS. 1–1A, the front and rear edges of the middle ring 80 form a general lapped or rabbet interface with the adjoining faces of the inner sections 124C, 124D immediately in front and to the rear of the rear rotor 42. This minimizes leakage between the inner turbine section 16 and surrounding outer compression section 12, and minimizes the adverse aerodynamic consequences of such leakage.

The configuration of the nested core engine 10 results in reduced potential for internal air leaks. A gas turbine engine with a conventional layout having two mixed-flow compressors and two axial flow turbines, would have 4 locations for blade tip leaks, and 7 locations for hub leaks. The engine 10, on the other hand, has only 2 places for shroud leaks (which are easier to control than blade tip leaks), and has 5 places for inter-shroud leaks. The net leakage of air is therefore expected to be less than in a conventional engine.

Most of the leak sites in the engine 10 have relatively low pressure differential across them, and also use the air leaks to an advantage in providing air for the foil bearings as previously described. There are two sites in the engine 10 that have high pressure differential across them: at the exit hub of the compressor section of the rear rotor 42, and between the hub of the turbine section of the rear rotor and the combustor 52. Brush seals 115 are used at these locations.

As seen in FIG. 1, in the preferred embodiment, the exit or rear edge of the middle ring 80 has a seal groove or channel 84 formed therein. The seal groove 84 interfaces with brush seals 115 mounted on the inner section 124d of the outer casing 24. In alternate embodiments, the brush seals may be mounted on the rotor and seated against seals surfaces on the casing. Brush seals 115 may for example comprise fine (0.003" $\Phi$) cobalt or ceramic fiber brushes running against hardened surfaces of groove 84. The brushes offer greatly reduced leaks compared to the conventional knife-edge or labyrinth seals. The orientation of the brush seals 115 in FIG. 1 is for example purposes only, and the brush seals may have any other suitable orientation rubbing against any other suitable sealing surface on the rear rotor.

The compressor and turbine sections 12, 16 of the engine 10 have either a presence of fuel vapors and/or partially burnt gases that offer some further lubrication to both brush seals 115, and to foil bearings 100, 100', as noted below. For example, it has been found that in the presence of hot Nickel or hot Silicon Nitride, very fine soot particles are formed that can act as a lubricant.

The engine 10 can function without lubrication, using only air for the foil bearings. However, the engine 10 takes advantage of the potential formation of lubricious soot from fuel vapors and partially burnt hydrocarbons to further enhance the life of the foil air bearings and the brush seals.

The turbine blades 46 of the rear rotor 42 are captured between the middle ring 80 and the inner turbine ring 82. The inner surface of the middle ring 80 and outer surface of the inner turbine ring 82 define the turbine section of the rear rotor. Thus, the rear rotor 42 includes an integral compressor section on the outside, and a turbine section on the inside, the compressor section substantially surrounding the turbine section. The turbine section of the rear rotor 42 is the second turbine stage 18 of the engine 10. The inner surface of the middle ring 80 is shaped to blend smoothly with the inner side of section 124C of the stator inner ring (see FIG. 1). The outer surface of the inner turbine ring 82 is shaped to form a suitable axial-flow turbine. The inner turbine ring 82 has a front extension portion 84 which projects inside and overlaps with the trailing portion of inner turbine ring 112 of the front rotor 32 (see FIG. 1). The overlap aids in reducing leaks between the engine turbine sections, and combustion chamber as noted previously. The trailing edge 86 of the inner turbine ring 82 of the rear rotor 42 has a channel formed therein which defines a circumferential seating surface. This seating surface in the inner turbine ring 82 is rotatably seated against foil bearing 100' (similar to foil bearings 100 described previously) mounted on an annular support flange of the pre-combustor 50. Accordingly, the rear rotor 42 is supported axially and radially both at the shroud 45 by foil bearing 100, and at the inner turbine rotor 82 by foil bearing 100' (see FIG. 1). The engine 10 may also include a brush seal (not shown) which interfaces with the channel and the trailing edge 86 of the rear rotor. The inner surface of the inner turbine ring of the rear rotor is shaped to define a portion of the combustion chamber 52 of the engine. As shown in FIG. 1, turbulator blades 48 are substantially short, straight blades which extend inwards from the inner surface of the inner turbine ring 82. The turbulator blades 48 extend sufficiently inwards to generate effective stirring of gases in the combustion chamber section 52 when the rear rotor 42 is spinning.

As noted before, FIG. 1 also shows the structural arrangement for the rotating components of the engine. In a conventional gas turbine engine, the blades of compressors and turbines are attached to disks, either directly or through fir-tree-root geometries. Operation of such conventional engines, with the rotation of the compressors and turbines, creates tensile stresses in the blades and the disks, with the internal structure of the disk resisting the tensile stresses. Such conventional engines can thus be said to have an endo-skeletal structure. In contrast, the engine embodiment shown in FIG. 1, can be said to have an exo-skeletal structural arrangement. In this embodiment, the first rotor has only a partial structural disk 32, near the base of the blades, and the second rotor 42 has only a narrow ring 82, instead of a disk, near the base of the blades. In the embodiment shown in FIG. 1, structural strength for retaining the compressor blades 34 and 44, and turbine blades 36 and 46, respectively of the first and second rotors, is provided by fiber-reinforced structural rings 35, 32R and 45, for the first and second rotors, respectively. As a clarification, the structural ring 35 helps retain compressor blades 34, the structural ring 32R helps retain turbine blades 36, and the structural ring 45 helps retain both the compressor blades and the turbine blades. The use of these structural rings places the blades in compression, which enables the use of blade materials that have low tensile strength but high compressive strength, such as ceramics that are capable of operation at high temperatures. The structural rings themselves are expected to develop high tensile hoop stresses from the blade centrifugal loads, and thus the use of fiber reinforcements, 114, which typically have high tensile strengths, offers an optimal structural arrangement. The fibers may be of a chopped/whisker variety for low cost, or the rings may have filament wound fibers for high strength.

Referring now to FIGS. 1–1A, and 1G, the precombustor generally comprises a top foundation or support plate 90, and tubes 92. The tubes 92 are mounted at the front edge to the support plate 90. The support plate 90 may be a generally annular and substantially flat plate. In alternate embodiments, the top plate of the precombustor may have any other suitable shape. The outer edge of the support plate 90 rests against the inner side of the inner section 124D of the outer casing as shown in FIG. 1. At the inner edge of the annulus, a collar or circumferential flange 94 projects forward from the support plate 90. As shown in FIG. 1, the collar 94 is sized and shaped to be conformally received inside the channel 86 in the trailing edge of the turbine ring 82 of the rear rotor 42. As seen best in FIG. 1, the collar 94 has a groove for seating the foil bearing 100', as stated before, and may be provided with a brush seal (not shown) to seal the second stage turbine rotor 18. The support plate 90 is perforated with apertures 96 for tubes 92. The ends of tubes 92 may be press fit, bonded or otherwise fitted into the apertures 96 to mount the tubes to the support plate. Tubes 92 extend substantially the height of cross-over passage 102 in the exhaust section 24R of the casing 24. The rear end of the tubes 92 is received into corresponding exhaust holes 54E in the casing. Thus, the top support plate 90 forms the upper surface of the precombustor 50 in the exhaust section 24R of the engine 10. Tubes 92 have a generally cylindrical shape, though in alternate embodiments the tubes may have any other suitable shape. The tubes may be of generally large size and few in number for low-pressure drag across the precombuster 50. The outer and inner surfaces of the tubes 92 are coated by a platinum and palladium catalyst.

Tubes 92 may be made of ceramic, such as silicon carbide, alumina, mullite, zirconium (high temperature resistance) or cordierite (excellent thermal shock resistance), to withstand the relatively high temperature with minimum weight penalty, and to provide naturally high surface area for the catalyst coatings. It is synergic that the tubes 92 have high pressure air on the outside, and lower pressure gases on the inside, imposing compressive stresses in the tubes, synergistically using the high compressive strength of structural ceramics. The tubes 92 have a suitable wall thickness allowing adequate heat transfer through the wall so that the tubes 92 also act as a recuperator.

As shown in FIGS. 1–1A, the combustion chamber section 52 of the engine 10 is generally formed by the rear face of the front rotor 32, the inner surface of the turbine ring 112 of the front rotor 32, the inner surface of the turbine ring 82 of the rear rotor 42, and the inner region inside the innermost tubes 92 of the pre-combustor 50. The combustion chamber section 52 is at the core of the engine within the engine hub (i.e. inner rings 112, 84 of the front and rear rotors 32, 42) and is surrounded by the turbine section 16 of the engine 10. The turbulator blades 48 (on the rear rotor 42) project into the combustion chamber section 52 as shown in FIG. 1. The turbulator blades 48 induce air and gases to flow into all regions of the combustion chamber by their centrifuging action when, the rear rotor 42 is spinning. Tip vortices shed by the blades 48 stir the air and gases in the combustion chamber, to ensure uniform post-combustion temperatures and the absence of any Pattern Factor and Radial Temperature Profiles, which create thermal problems for the combustors and turbines in conventional gas turbine engines.

FIGS. 1 and 1A show a starter cartridge, 56, that is a means to start the engine. Other means may be used to start the engine. The cartridge may be a small rocket-type generator of hot gases. As shown in FIGS. 1 and 1A, the starter cartridge 56 is threaded into the engine. Alternative means of fixing the cartridge into the engine may be used. The starter cartridge is shown to be located along the axis of the engine, but locations offset from the axis may be used. The location and orientation of the starter cartridge is designed to feed the hot gases from the cartridge directly into the combustion chamber of the engine, such that the exhaust gases will pre-warm the combustion region for efficient combustion of fuel and air, and the exhaust gases will also drive the turbines downstream of the combustor, to thereby drive the compressors and pump air (and fuel) into the engine combustion region. The starter cartridge may also have a combustible casing, to minimize blockage of the flow of air and fuel through the combustor after the cartridge has burnt out.

As shown in FIG. 1, in the preferred embodiment, the engine core has a cartridge starter 56 embedded at the bottom 124B of the engine casing 24. When ignited, the rapidly burning cordite charge releases hot, high-velocity gases that flow through the combustion chamber section 52 and impinge against the turbine blades 36, 46 of the front and rear rotors 32, 42. This causes the turbines 17, 18, and the attached compressors 13, 14 to start spinning, inducing air flow through the engine 10. The hot cartridge gases also begin heating the catalyst-coated tubes 92 in the pre-combustor 50 downstream of turbine 18. Simultaneously, fuel begins spraying (in the direction indicated by arrow F1 in FIG. 1) into the compressor 13 and reaction begins on the catalyzed surfaces of the rapidly heating tubes 92 of the pre-combustor 50. This rapidly starts the engine 10 as the cartridge 56 burns out. As noted before, the cartridge 56 has a combustible casing for the cordite or equivalent charge. Hence the air and gas flow path inside the combustion chamber section 52 becomes unobstructed as the engine 10 spools up and the cartridge 56 burns out. In alternate embodiments, the engine may have a small, high-speed, permanent magnet motor/generator in the nose cone. This motor/generator can be cooled by fuel flow, for benefits of high power density and lightweight. Direct mounting of electric motor/generator and fuel pump on the engine shaft can eliminate the auxiliary gearbox, for considerable savings in cost and improved reliability for the small engine.

In the embodiment shown in FIG. 1A, the starter cartridge, 56, has a unique shape of the starter cartridge base, 56B, such that the shape of the base forms a toroidal recirculation region, 56T (seen best in FIG. 1G), for the air and fuel, to help stabilize combustion, after the cartridge with the combustible casing has burnt out. In alternate embodiments, the base of the cartridge may have any other shape, including a low-cost flat shape.

As the engine 10 spools up, suction generated at the inlet 22 draws air (in the direction indicated by arrow A in FIG. 1) into the inlet 22, and then into the first compressor stage 13. FIG. 1 shows the process of introduction of the fuel, F1, into the engine, wherein the fuel first cools and lubricates the rolling element bearing 30, and is then centrifuged radially along a fuel feed surface (such as slots 33, though any surface may be used) outward by the compressor rotor to be injected as a then sheet-like spray into the air flow path. Fuel flows (in the direction indicated by arrow FE) under pressure and/or gravity feed from the fuel source into the nose cone 26 and then through bearing 30 into the fuel slots 33 at the front face of the front rotor. From the fuel slots 33, fuel is sprayed (as indicated by arrows F1) into the air stream A in the compressor 13. As noted before, the centrifugal action of the spinning rotor 32 generates outward pressure on the fuel in slots 33 to spray fuel substantially across the compressor inlet. As the fuel enters the flow path into the compressor section 12 of the engine, the combination of the pressure difference and the relative velocity between the fuel and the air causes the fuel to be atomized in the compressor into small droplets and/or mist particles. The effect of liquid fuel introduction at the inlet face is equivalent to flying a turbine engine through light rain, and causes little performance degradation of the compressor 12 of the engine 10. A great advantage accrues from this manner of fuel introduction for the small engine: countering the effects of the square-cube law on the engine combustor, by converting the entire engine into a combustor, as noted below. The first compressor stage 13 compresses the fuel air mixture as described previously. From the first compressor stage 13, the mixed flow moves through pathway 40 (in the direction indicated by arrow AC1) through the intermediate stator 38, into the second compressor stage 14. The fuel air mixture is further compressed in the second compressor stage 14 and then flows as indicated by arrow AC2 through the rear stator 39 into the transition 106 at the rear of the engine casing 24 (see FIG. 1). Air from the compressor is transferred (in direction indicated by arrow PC) across the exhaust gas flow path by flowing the pressurized air over hollow tubes 92 of the pre-combustor 50 that have exhaust gases flowing axially inside the tubes.

The fuel for the engine injected into the inlet face of the first compressor 13, and atomized by the shearing action between the centrifuged fuel droplets and the high relative speed of the air flow A, is substantially evaporated by the time the fuel reaches the catalytic pre-combustor 50. The catalytic surfaces of the pre-combustor initiate combustion, and raise the temperature of the fuel-air mixture from the compressor delivery temperature ($\approx$600 F./600 K.) to about 1000 F./800 K. This temperature is high enough to initiate rapid combustion in the main combustion chamber 52, but low enough to be within acceptable temperatures ($\approx$1200 K.) for the catalyst. The catalyst surfaces in the pre-combustor are maintained above its operating temperature by the exhaust gases flowing through the tubes 92.

The burning mixture of air and partially oxidized fuel flows from the catalytic pre-combustor 50 to the fully-stirred lean-burn main combustion chamber 52 in the central part of the engine 10.

Conventional combustors, fed by warm air from compressors and cold fuel injected into the warm airstream, cannot sustain stable combustion under all operating conditions if they were to operate under homogenous conditions of premixed fuel and air, due to flammability limits and due to the problems of auto-ignition, flashback and acoustic resonance. Therefore, conventional combustors operate on the rich-lean system, or the newer rich-quench-lean systems for low NOx.

The engine 10 aims to operate to use the pre-mixed, pre-vaporized system, but uses the catalytic pre-combustor to initiate combustion. The lower compressor pressures and exit temperatures, combined with substantially complete homogeneity of the fuel-air mixtures, helps ensure the absence of flash-back. The resulting partially burnt hot gases have much wider flame stability limits, and thus can operate using the lean-premix system. Such catalytic lean-premix combustors have been demonstrated in laboratories. Catalytic combustors also avoid acoustic resonance.

Figure 4:
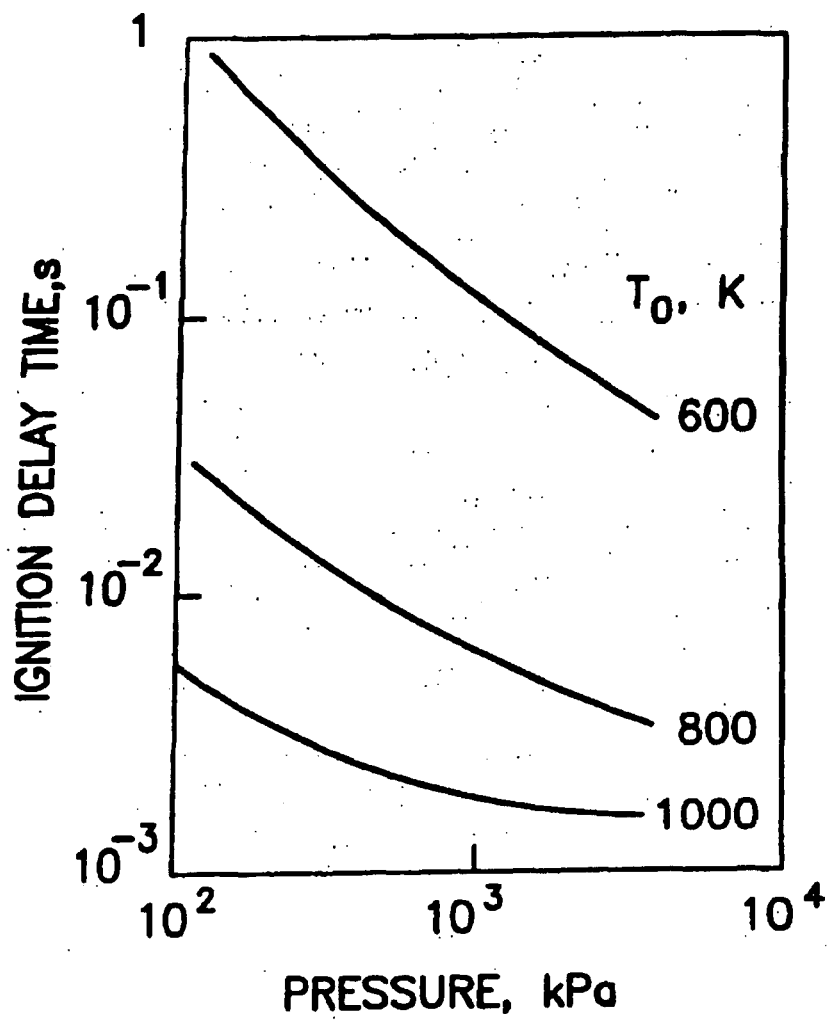
FIG. 4 is a graph showing variation of ignition delay time at a number of air temperatures with respect to pressure in accordance with the prior art.

There is some concern that, for conventional, large, high-pressure, gas turbine engines, fuel cannot be introduced too early in the combustor. This is because the very short combustion delay period at the high air delivery temperatures can cause flashback in the pre-combustion region. FIG. 4 shows the variation of delay period with air temperature.

For the engine 10, it is synergistic that fuel is introduced early in the compressor 12, but flashback is prevented because the low temperatures cause the delay period to be longer (>1 sec) than the residence time ($\approx$1 msec) in the compressor 12. However, once catalytic pre-combustion has warmed up the gases, the delay period becomes short enough ($\approx$msec) to allow completion of combustion within the residence time ($\approx$several msec) for the combustion chamber 52.

A major advantage of the lean pre-mixed combustion chamber is the general complete absence of soot or smoke. In conventional engines, soot is caused by pyrolysis of large fuel droplets before they can vaporize. In the engine 10, fuel is vaporized, by the whipping action of compressor blades and the large relative air velocities, well before the temperatures get hot enough for pyrolysis. The absence of exhaust smoke offers a stealth advantage for military systems. It also implies an absence of carbon balls, that can cause hot-section erosion in conventional engines. In addition, lean pre-mixed combustors have extremely low NOx, which would be useful for commercial applications of the engine, such as for APUs.

The airflow swallowing capacity of engines decreases with square of engine linear dimensions, while the combustor volume diminishes with the cube of engine scale. Small engines also have lower cycle pressure ratios, needing larger- combustor volume. However, the specific heat release rate (e.g. BTU/hr per ft$^3$ per atm. pressure or kW/m$^3$ per atm.) is rather limited by the combustion chemistry of fuel-air mixtures. The result is that, in conventional engines, combustors occupy an increasingly larger fraction of the total engine volume as engines are scaled down.

For the engine 10, almost the entire engine can be used as the combustor, with the fuel mixing region in the compressor 12, the catalytic pre-combustor 50 in the cross-over region, the main combustion chamber 52 within the central part of the engine (that is wasted in conventional engines), combustion continuing in the contra-rotating turbine 16 that is immune to pattern factors (if the engine was to have one), and the combustion reaching completion, for final suppression of unburned hydrocarbons, within the tubes 92 of the crossover region. The engine 10, thus, overcomes the square-cube laws of scaling down.

From the main combustion chamber section 52, the hot combustion gases are directed (as indicated by arrows C in FIG. 1) into the rotating nozzle of the first turbine stage 17. For optimum efficiency in creating torque, the exit gas (indicated by arrow AT1) relative jet velocity from the nozzle 17 should be about twice the rotor blade velocity for the first turbine stage. Thus, the gases issuing from first turbine stage still have a large tangential velocity component. This is used to create torque for the second turbine stage 18, without the use of an intervening nozzle. The second turbine stage 18 may have some additional expansion of gases for torque generation (to power the rear rotor), though this will be minimized in order to minimize loss of kinetic energy in the exhaust gases. In combination, the two turbine stages 17, 18 essentially act as one conventional turbine nozzle and rotor set, except that the nozzle is allowed to rotate and hence generate torque to drive its own compressor. This reduces the number of bladed stages for the turbine section. Any loss in turbine efficiency because the first turbine acts as a free-to-spin nozzle may be largely compensated for by the absence of blade tip clearance losses (due to integral shroud 35 nested in the casing surface).

Exhaust gases flow (as indicated by arrow E) through tubes 92 in the crossover region of the pre-combustor 50, as shown in the FIG. 1. The tubes 92 may also be coated on the inside with a Platinum/Palladium oxidation catalyst, to fully suppress any unburned hydrocarbons, and any smoke if the engine ever makes smoke (with lean pre-mixed combustion, the engine 10 is expected to not produce any smoke).

Figure 3:
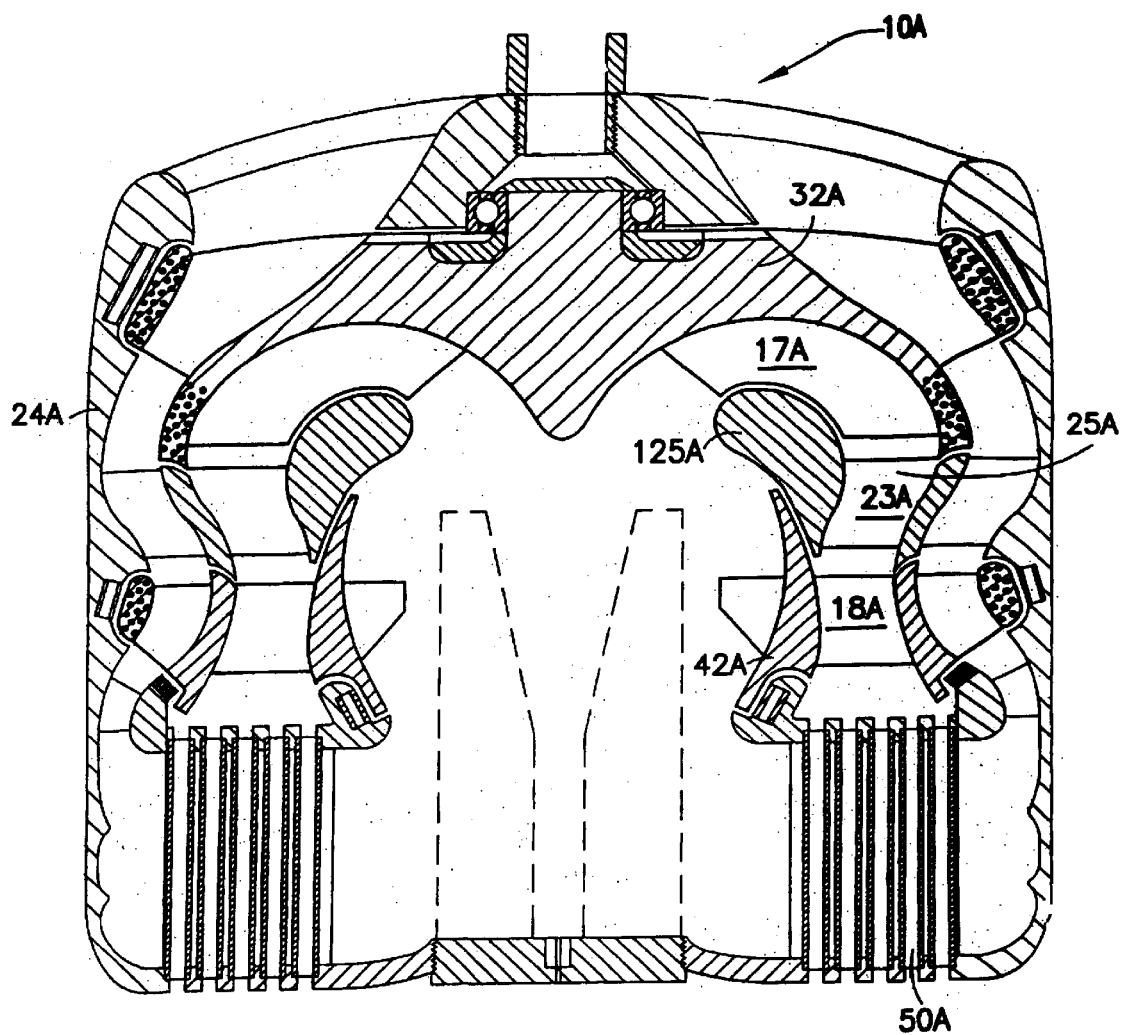
FIG. 3 is a cross-sectional view of a gas turbine engine in accordance with a second preferred embodiment of the present invention.

Referring now to FIG. 3, there is shown a nested core gas turbine engine 10A in accordance with another preferred embodiment of the present invention. Except as otherwise noted below, engine 10A in FIG. 3, is substantially similar to engine 10 described above and shown in FIGS. 1–1G, with similar features having similar reference numbers. Engine 10 also includes an outer casing 24A, a front rotor 32A, a rear rotor 42A, and pre-combustor 50A. The front and rear rotors 32A, 42A have integral compressor and turbine sections. In this case however, the front rotor 32A, does not have an inner turbine ring similar to ring 112 of the front rotor 32 in engine 10. Instead, the engine casing 24 A has an intervening stator nozzle 25A between the first turbine stage 17A and the second turbine stage 18A on the rear rotor. The stator nozzle 25A comprises an inner ring 125A and vanes 23A which are mounted to the casing as shown in FIG. 3.

Figure 5:
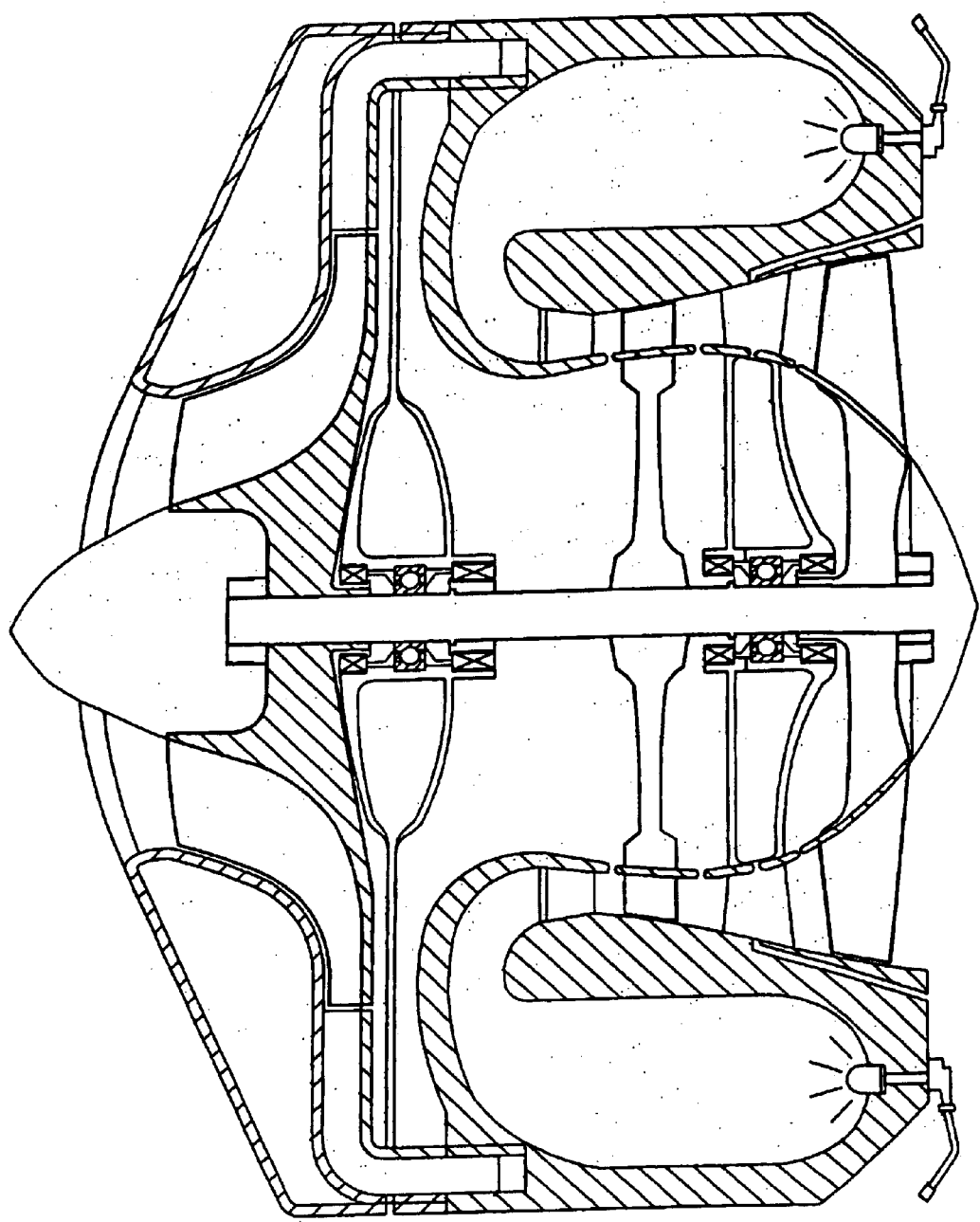
FIGS. 5 and 6 are respectively schematic cross-sectional views of a conventional engine with centrifugal compressors and wrap-around burners, and a conventional engine with axial compressors and in-line burners.
Figure 6:
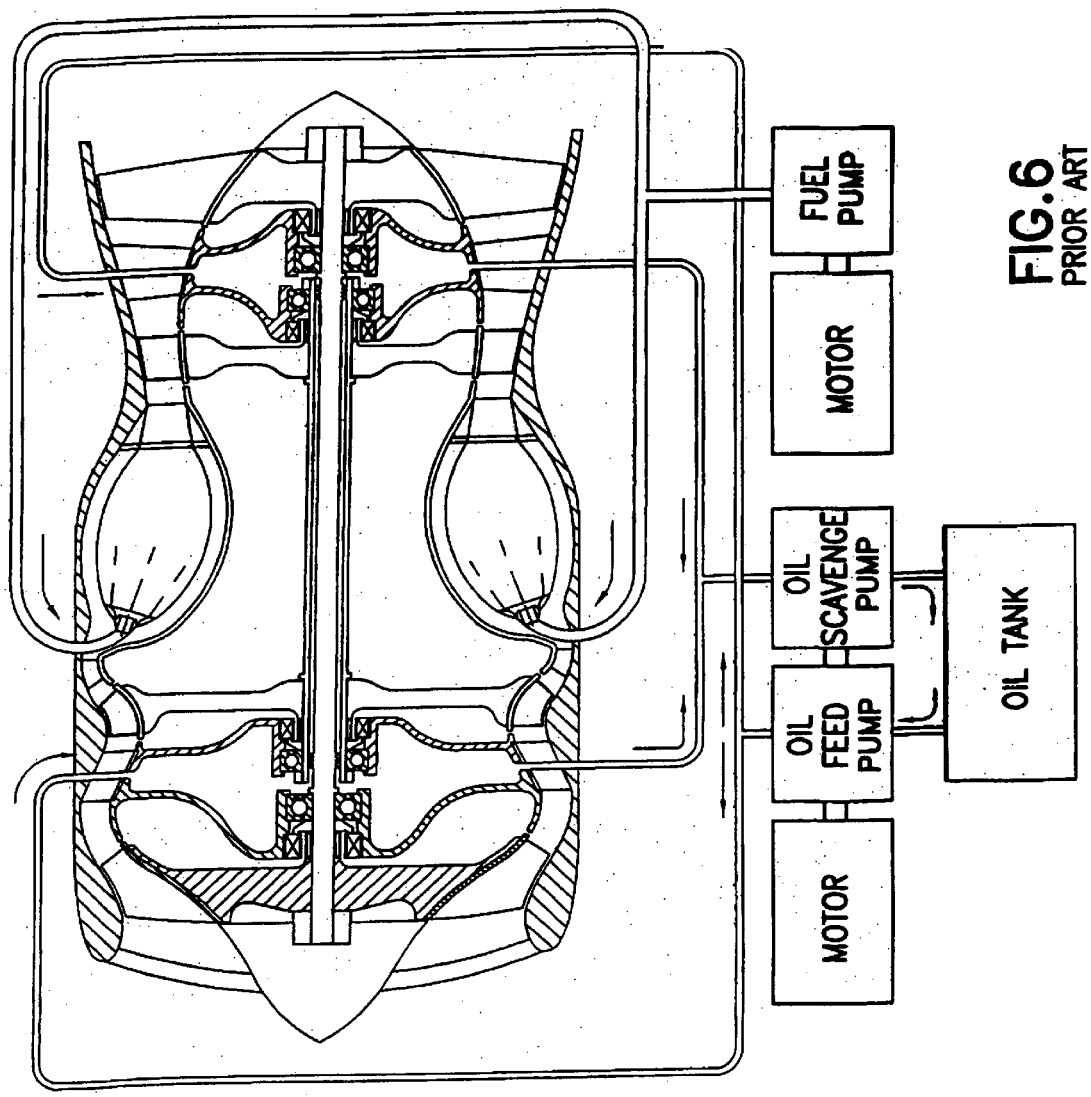

FIGS. 5 and 6 are schematic representations of the two common conventional engines: centrifugal compressors with wrap-around burners, and axial compressors with in-line burners. The two engines and the engine 10 shown in FIG. 1 have the same air flow swallowing capacity, and the about the same power. However, the engine 10, 10A has about half the frontal area of a centrifugal flow engine, and about half the length of an axial flow engine. The weight of the engine 10, 10A may be one-third that of the competition, because the engine 10, 10A does not have the heavy, solid shafts of the conventional engines. In addition, the engine 10, 10A avoids the shaft critical speed problems of small gas turbine engines. By using low-expansion, high-modulus ceramic materials for the structure, it gains control over the tip clearances in the rotor systems, and hence has significant performance advantages.

The engine 10, 10A may have many derivatives, all using a common core, but being coupled to different tail sections. This will enable the core engine 10, 10A to be used for a variety of applications, with a variety of thrust systems optimum for each air vehicle.

Figure 7:
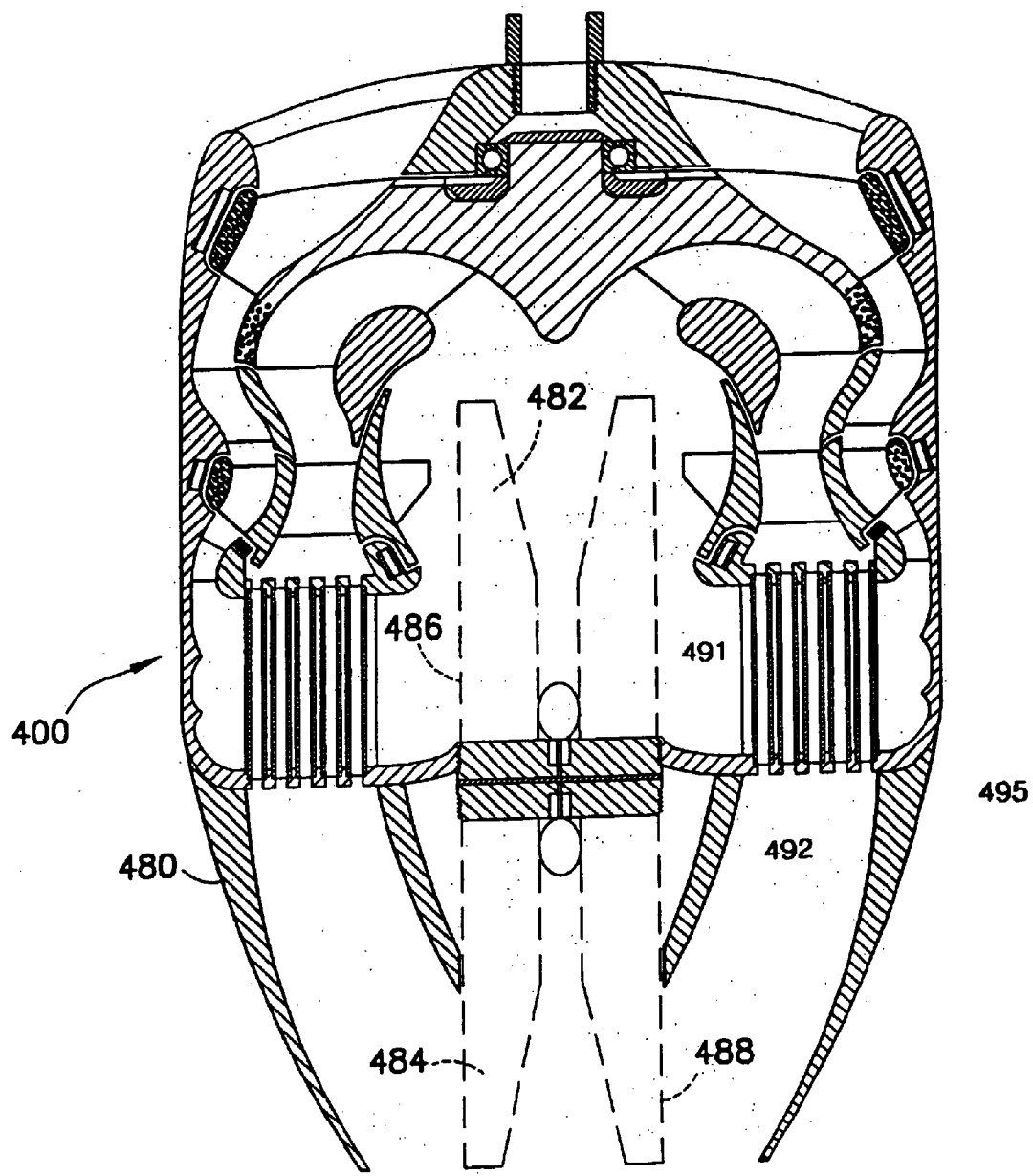
FIGS. 7–10 respectively are schematic cross-sectional views of a turbo-jet engine, turbo-fan engine, high-bypass ration turbo-fan engine, and ultra-high bypass ratio turbo-fan engine in accordance with other preferred embodiments of the present invention.

An example of a turbojet 400 incorporating features of the present invention is shown in FIG. 7. This embodiment has a thrusting nozzle 480 attached to the aft end of the core engine similar to engine 10. In this embodiment, the engine 400 is projected to produce about 20 lbf (9 kgf) of thrust, at a Specific Fuel Consumption ≈1.5 lbm/hr/lbf (1.5 kg/hr/kgf). This engine 400 will be suitable for propulsion of high speed air vehicles 200, for example precision-targeted Mini-Cruise Missiles launched from 70 mm (2.75 in.) rocket tubes (see FIG. 11). The starter and launch-thrust booster cartridges 482, 484, with combustible casings 486 and 488, are built into the engine.

As noted above, FIG. 7 shows an embodiment of a turbojet engine 400 that has a core gas turbine engine similar to engine 10 described previously, and hence similar features are similarly numbered. In this embodiment, a rocket type starter cartridge, 484, is used as a boost cartridge for the turbojet engine, which may be used to launch or accelerate the turbojet engine and an air vehicle (similar to the air vehicle 200 shown in FIG. 11) powered by the turbojet engine. In the embodiment shown in FIG. 7, ignition systems, 491 and 492, for the core engine starter cartridge and the turbojet engine boost cartridge respectively, are connected to a common ignition initiation system, 495. Further, in the embodiment shown in FIG. 7, the starter cartridge 482 used to start the core engine is similar to the boost cartridge 484. In alternate embodiments, the starter cartridge and the boost cartridge may be different.

Figure 8:
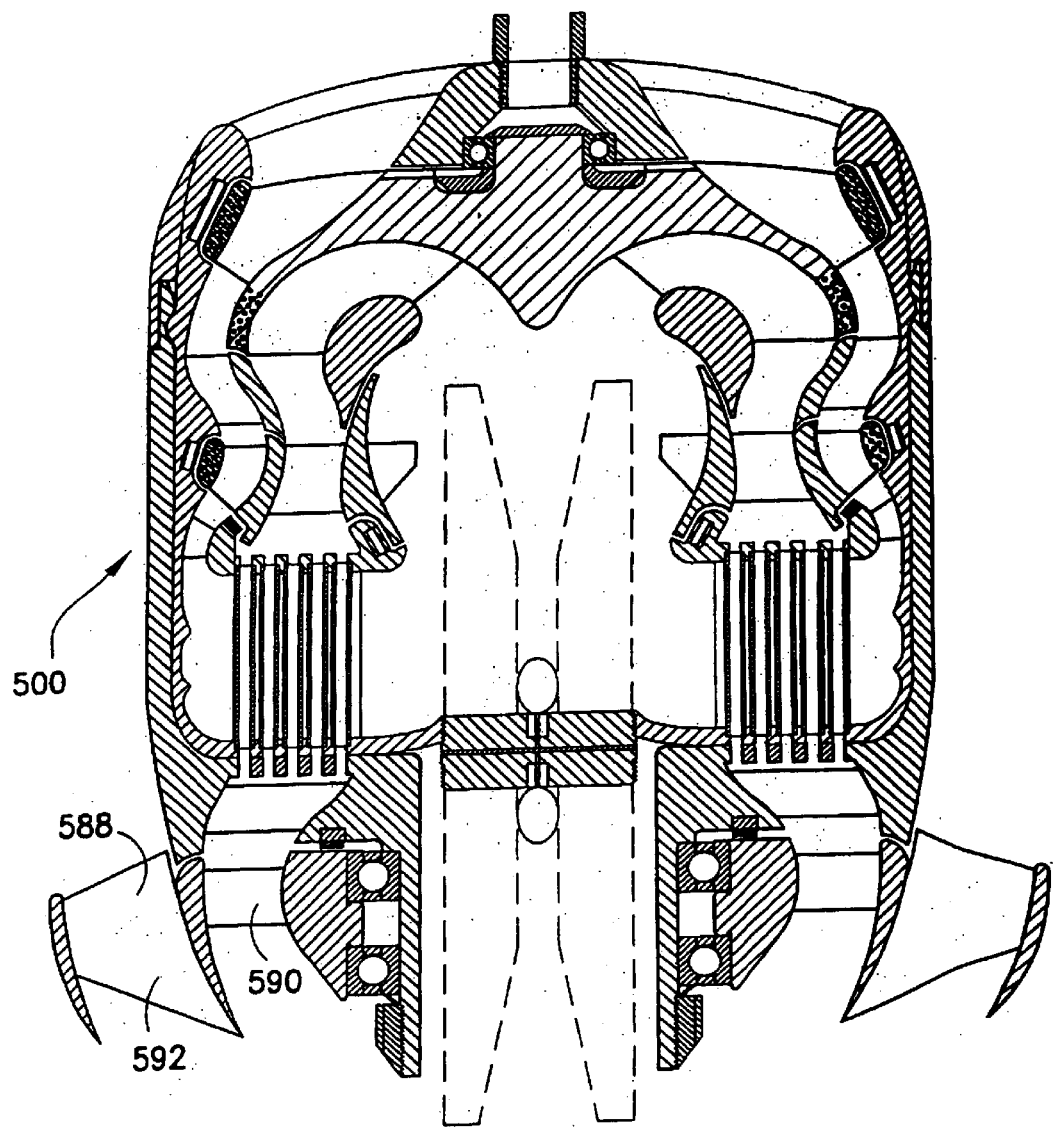

An example of a low bypass turbo-fan engine 500 incorporating features of the present invention is shown in FIG. 8. The thrusting nozzle can be replaced by a an integrated turbo-fan 588, in which a turbine 590 in the exhaust gas flow path drives a fan 592 directly radially outside the turbine. To minimize shock losses at the high tip speeds, the fan blades are to have sharp leading edges combined with blade sweep and lean. There is a slight gain in thrust (to 21 lbf), and a slight reduction in SFC [to ≈1.45 lbm/hr/lbf (0.9 kg/hr/kgf)]. The main advantage of this version is the gain in propulsive efficiency of the system due to Wake Ingestion Propulsion of the airframe. The noise is about the same as the turbojet, because the lower noise from lower exhaust gas velocity is countered by noise from the transonic fan blades. This version will also be more expensive than the turbojet, and is better suitable to long-range missiles or non-expendable targets. The starter and launch-thrust booster cartridges are built into the engine.

For long-range/high-endurance air vehicles, and for V/STOL, hover-capable air vehicles, higher Bypass Ratio is more desirable, to reduce fuel consumption and to reduce noise. This is achieved by additional derivatives of the engine as discussed below.

Figure 9:
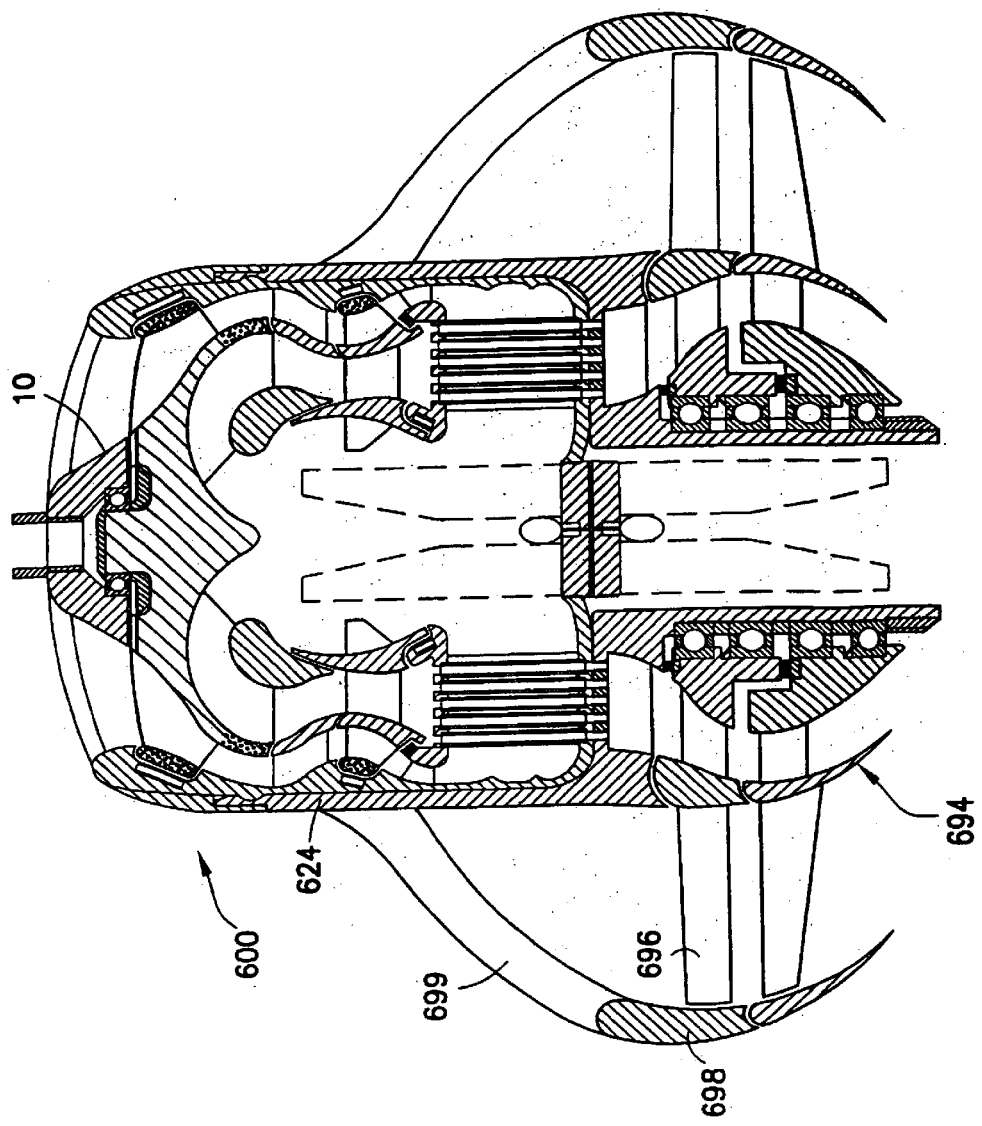

An example of a high-bypass twin contra-rotor fan engine 600 incorporating features of the present invention is shown in FIG. 9. The aft section of this engine has a two-stage contra-rotating turbine 694 driving integrated shroud-fans 696 at relatively low speeds. This allows the fan diameter to be larger without incurring shock losses on the blade tips. The result can be higher thrust (≈25 lbf), lower fuel consumption ≈1.2 lbm/hr/lbf (1.2 kg/hr/kgf) for longer range/endurance, and lower noise. This embodiment is likely to be well suited to very long-range cruise missiles 200' (see FIG.

12) and completely reusable reconnaissance air vehicles. FIG. 9 shows such an aft fan with a shroud 698 for low tip losses and enhanced propulsive efficiency. The shroud 698 is supported by a grill 699 attached to the mid-section 624 of the core engine that also provides F.O.D. resistance by blocking ingestion of birds and bugs.

Figure 10:
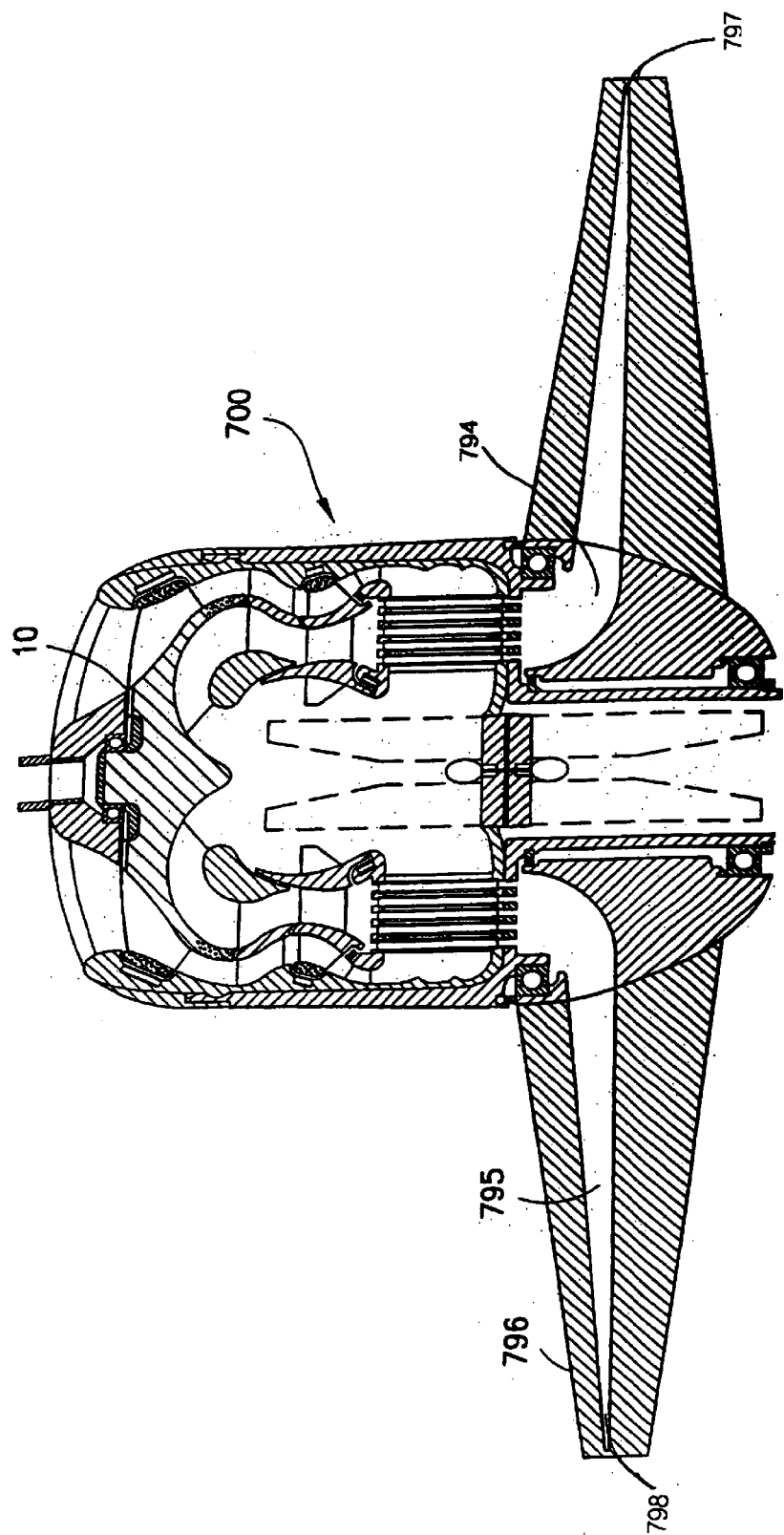

An example of an ultra-high bypass lift-fan engine 700 incorporating features of the present invention is shown in FIG. 10. Pressurized gases can be taken from a core engine and ducted to hollow tubes 795 within the blades 796 of a rotor, where the gas is allowed to escape through tip jets or aft-facing slots 798 in the rotor blades. Such a rotor is ideal to generate lift for a hover-capable air vehicle because of the absence of counter-torque eliminates the need for a tail-rotor. The exemplary embodiment of the ultra-high-bypass engine 700 shown in FIG. 10 has the core gas turbine engine similar to engine 10 described previously. Hence, similar features are similarly numbered. In this embodiment, the fan is driven by hot gases from the core engine, wherein the hot gases flow from the core engine via a rotating plenum 794, though passages 795 of the hollow fan blades 796, and are effluxed from the passages via aft-facing tip jets 797 or aft-facing slots 798 on the upper surface of the fan blades 796. Gases issuing from the tip jets 797 will provide torque to help drive the fan in a rotational direction. Gases issuing from the slots 798 will provide torque to help drive the fan in a rotational direction as well as enhance the lifting effectiveness of the fan blades 796.

Figure 13:
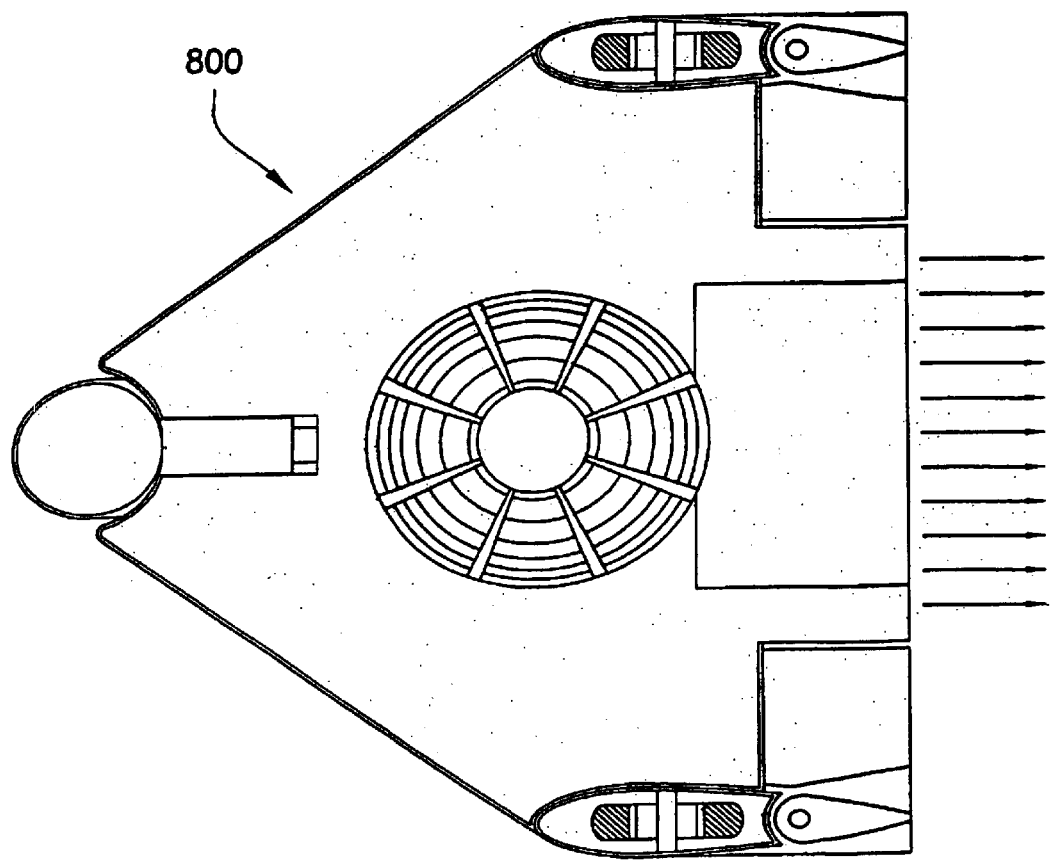
FIGS. 13 and 14–14A respectively are schematic top plan, elevation, and bottom plan views of an unmanned aerial vehicle (UAV) in accordance with yet another preferred embodiment of the present invention.
Figure 14:
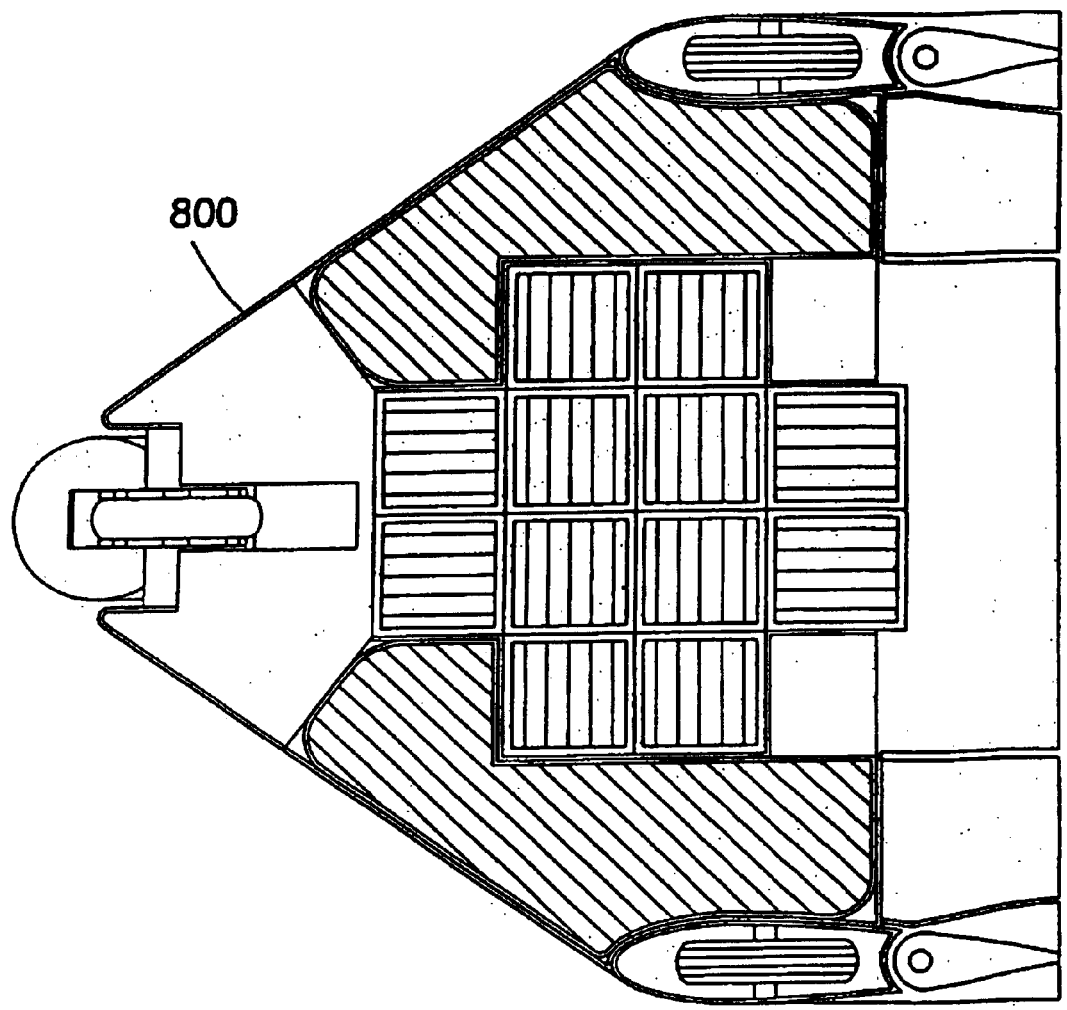
Figure 14A:
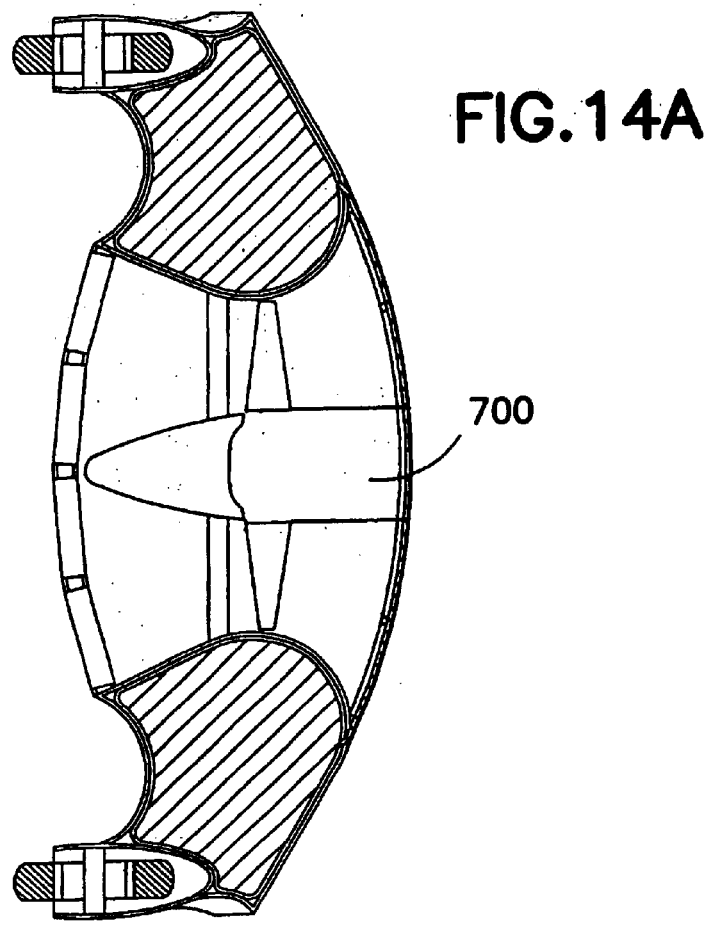
Figure 14B:
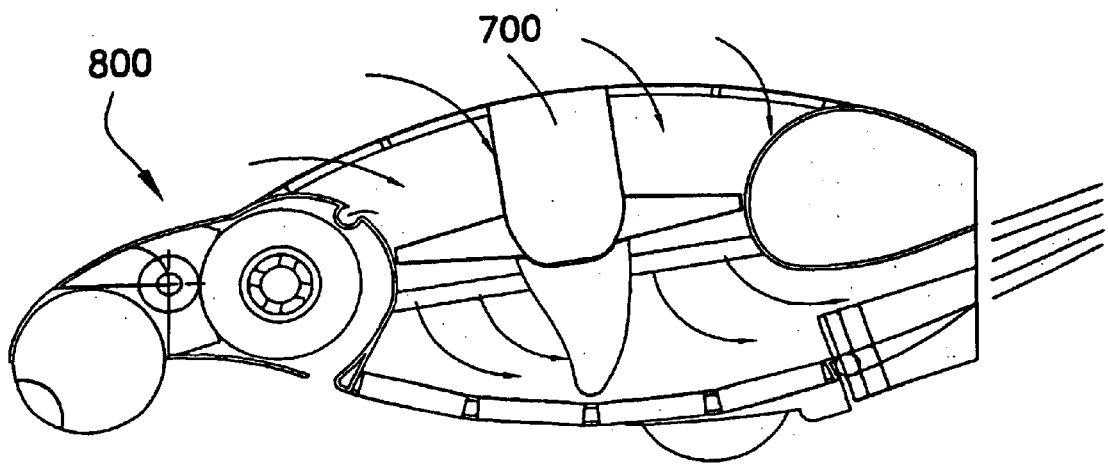
FIGS. 14B–14C respectively are schematic side elevation and rear elevation views of the UAV in FIG. 13 in a first mode of operation (e.g. cruise mode), and FIGS. 15A–15B respectively are schematic side elevation and rear elevation views of the UAV in FIG. 13 in a second mode of operation (e.g. hover mode)
Figure 14C:
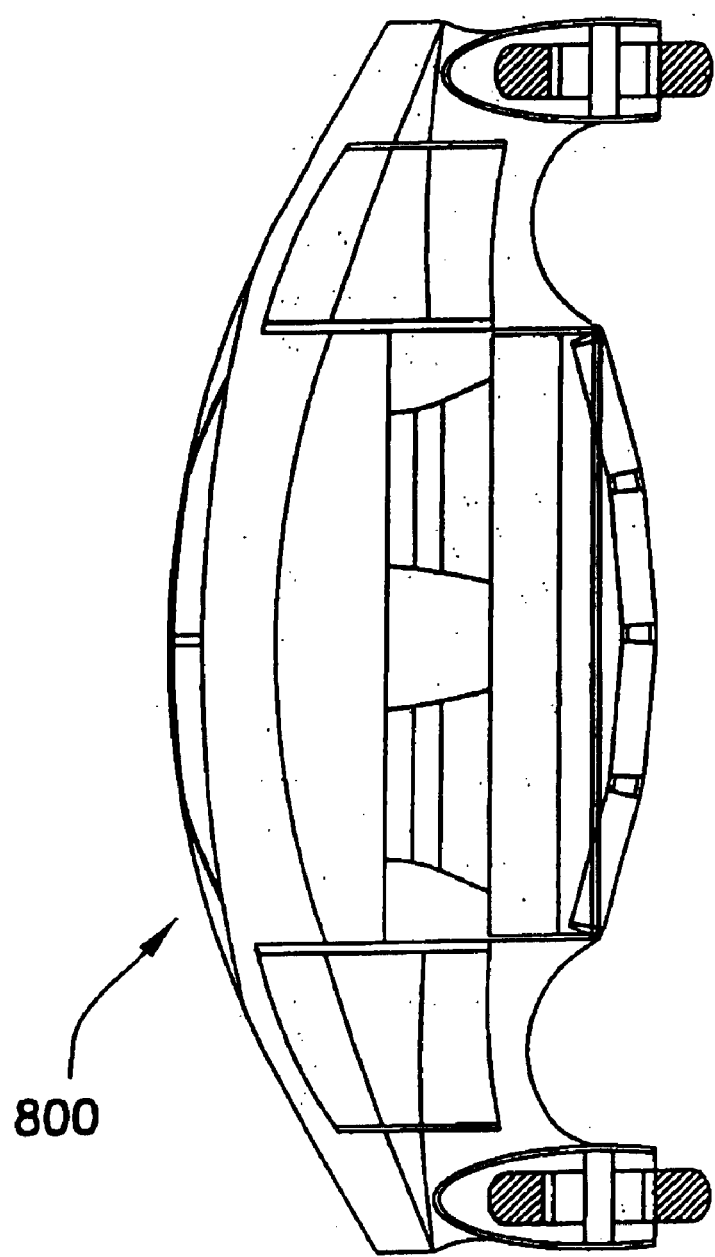
Figure 15A:
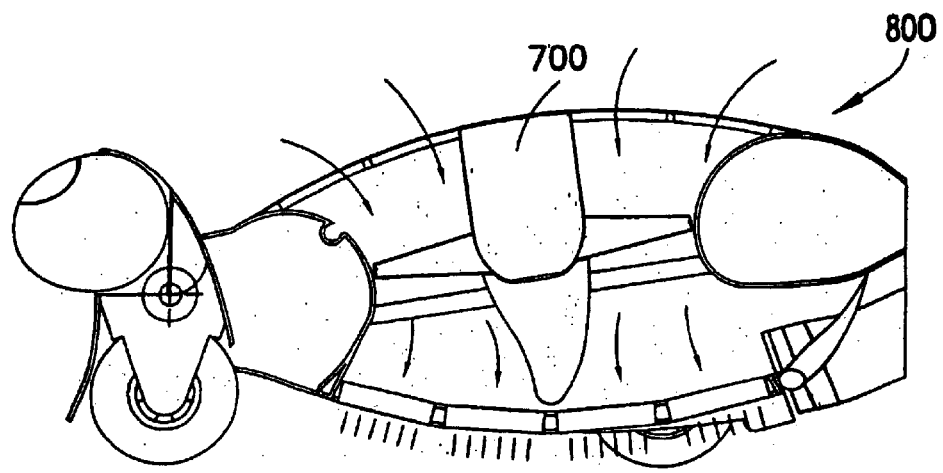
Figure 15B:
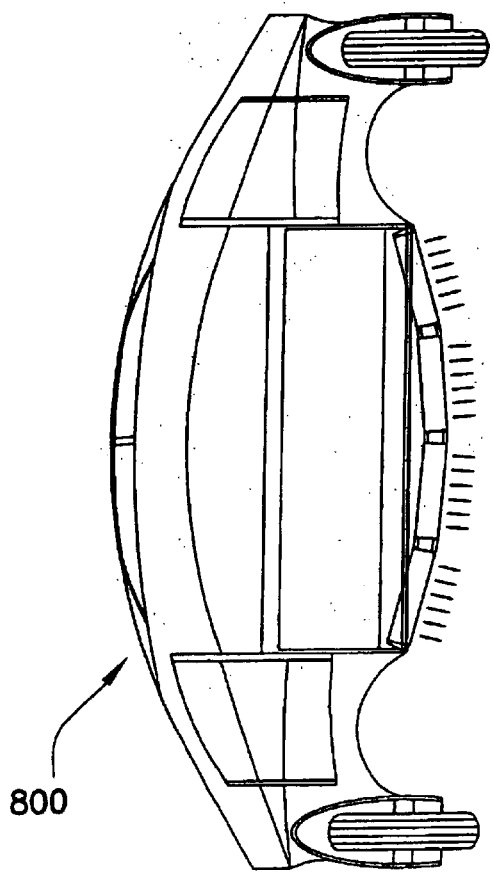

Other benefits include greatly increased thrust (≈35 lbf), lower fuel consumption ≈0.9 lbm/hr/lbf (0.9 kg/hr/kgf) for longer range/endurance, and lower noise. The main disadvantage is losses incurred in the ducts to the blade jets. However, this is balanced by elimination of losses associated with a power turbine, and the losses in the multi-stage gearboxes used in conventional helicopters. One example of a UAV embodiment 800 using engine 700 is shown in FIGS. 13, 14A–14C and 15A–15B. The configuration of the UAV shown in FIGS. 13, 14A–14C and 15A–15B is merely an example of a suitable UAV configuration using the ultra-high bypass lift-fan engine 700. The ultra-high bypass lift-fan engine may be used with any other suitable UAV configuration. As seen in FIGS. 13–14A, the engine 700 is substantially centrally mounted in a vertical duct of the engine. The lower opening of the duct has doors or louvers which are opened during hover (see FIGS. 15A–15B), and closed or partially closed when the UAV 800 is moving horizontally (see FIGS. 14B–14C). The air passage has a horizontal exhaust which can be opened or closed with a flap at the exhaust opening as shown in FIGS. 14B–14C.

FIG. 11 shows an example of an application of the Nested Core Engine used for a small, high-speed air vehicle, 200, such as for example a missile or an Unmanned Aerial vehicle. As seen in FIG. 11, in this embodiment the vehicle 200 has a body 203, with an internal fuel tank 202, wherein the fuel tank is connected directly to the fuel inlet of the Nested Core Engine, as also shown in FIG. 7 and described before.

FIG. 12 shows an example of another application of the Nested Core Engine with a power turbine in the engine exhaust driving an aft fan, used for a small, high-speed air vehicle 200', such as for example a missile or an Unmanned Aerial vehicle. As seen in FIG. 12, in this embodiment the vehicle 200' has a body 203', with an internal fuel tank 202', wherein the fuel tank is connected directly to the fuel inlet of the Nested Core Engine, as also shown in FIGS. 7 and 9, and described before.

The nested core gas turbine engine 10 described above and shown in FIGS. 1–1A, and 3, is a new gas turbine engine that offers about half the frontal area compared to the typical small turbine engines with centrifugal compressors, and offers about half the length compared to typical gas turbine engines with axial flow compressors. Simultaneously, an engine comprising features of the present invention can offer one-third the weight, as well as dramatic improvements in component and overall efficiencies that compensate for the adverse effects of scaling down engines.

In the preferred embodiments described above, the turbine section of the engine is substantially nested within the compressor section of the engine, and again, the combustor section of the engine is nested within the turbine section of the engine. This gives the engine an appearance of having been telescoped into itself, offering very significant reductions in engine overall volume and weight. Additional advantages of the nested core gas turbine engine 10, 10' in comparison to conventional gas turbine engines are illustrated in the graphs shown in FIGS. 18–25.

A nested core gas turbine engine comprising features described above can be the basis for new applications, such as mini-cruise missiles, targets & drones, and cruising & hovering Unmanned Aerial Vehicles, using turbojet, low-bypass turbofan, high-bypass turbofan and slot/tip-driven lift rotor versions of the engine.

It should be understood that the foregoing description is only illustrative of the invention. Various alternatives and modifications can be devised by those skilled in the art without departing from the invention. Accordingly, the present invention is intended to embrace all such unforeseeable alternatives, modifications and variances which fall within the scope of the appended claims.

Some examples of such alternative embodiments are shown in FIGS. 26–29, and 29A. These embodiments show the nested core engines 900–900D with combustor sections 952, 952A, 952B, 952C, and 952D nested substantially radially within turbine sections (917–919, 917A–919A, 917B–918B, 917C–918C, and 917D–918D), and the turbine sections nested substantially radially within compressor sections (913–916, 913–915A, 913B–915B, 913C–915C, and 913D–915D). These embodiments have a greater number of compressor and turbine stages compared to the preferred embodiment for the engine 10, 10' discussed earlier and shown in FIGS. 1–1A and 3.

Figure 29:
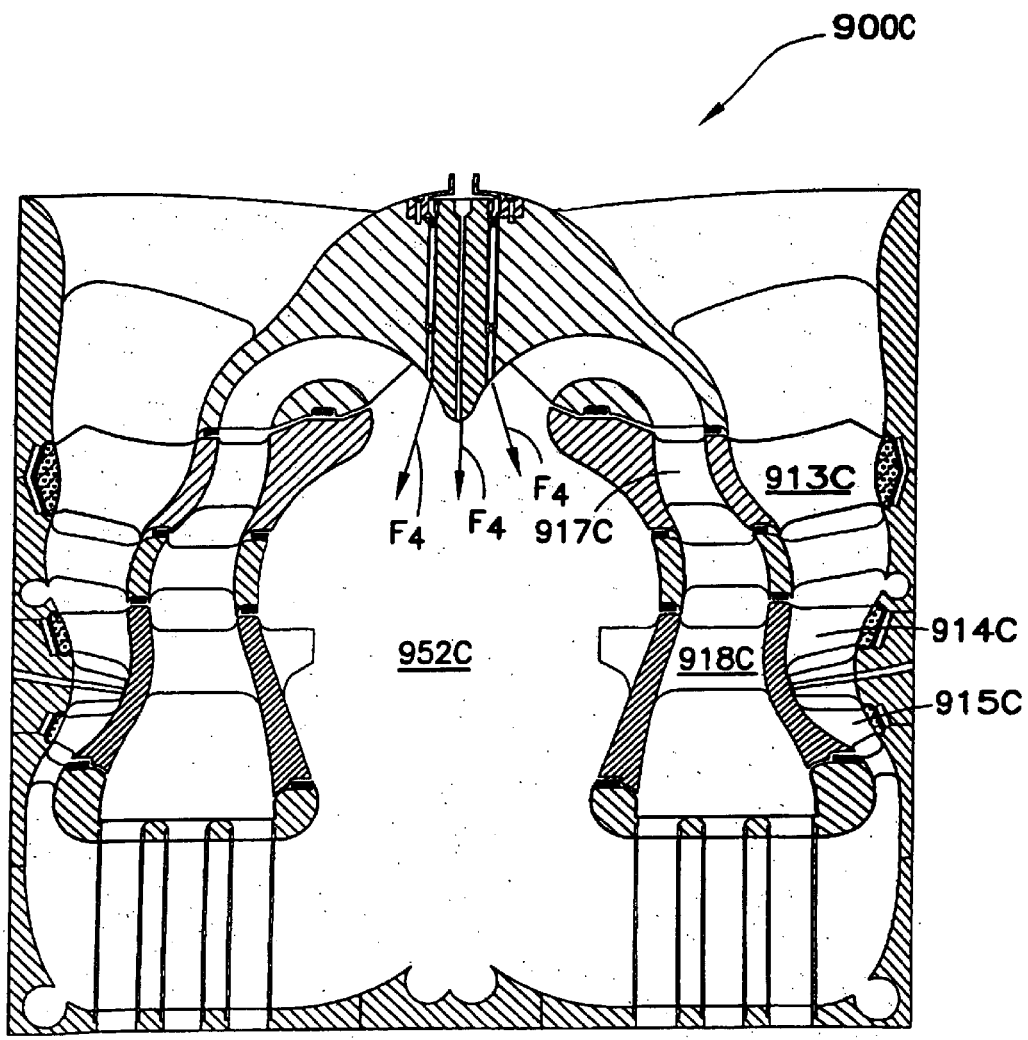
FIGS. 29–29A are a schematic cross-sectional views of a gas turbine engine in accordance with still other preferred embodiments of the present invention.
Figure 29A:
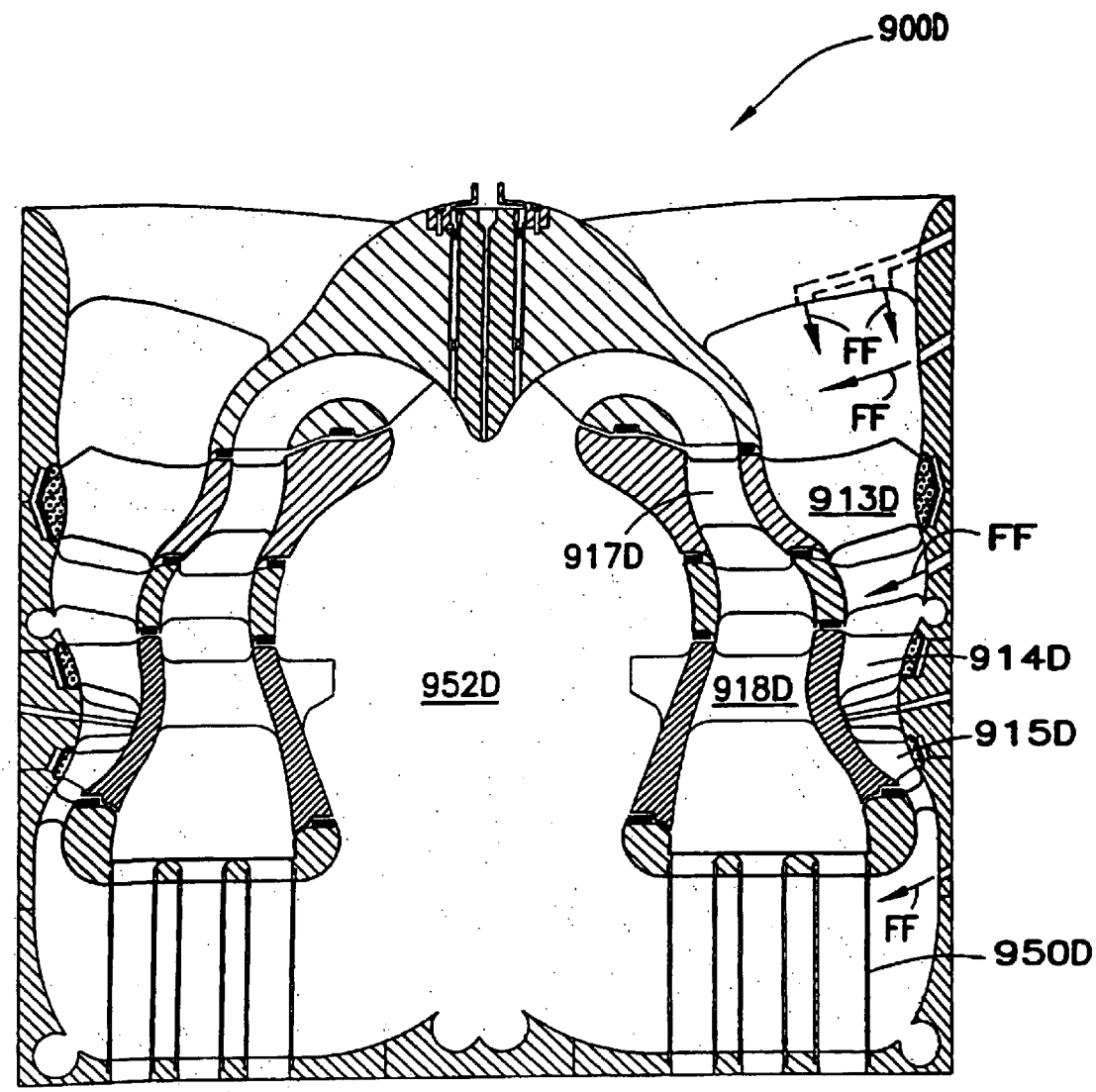
Figures 30A, 30B:
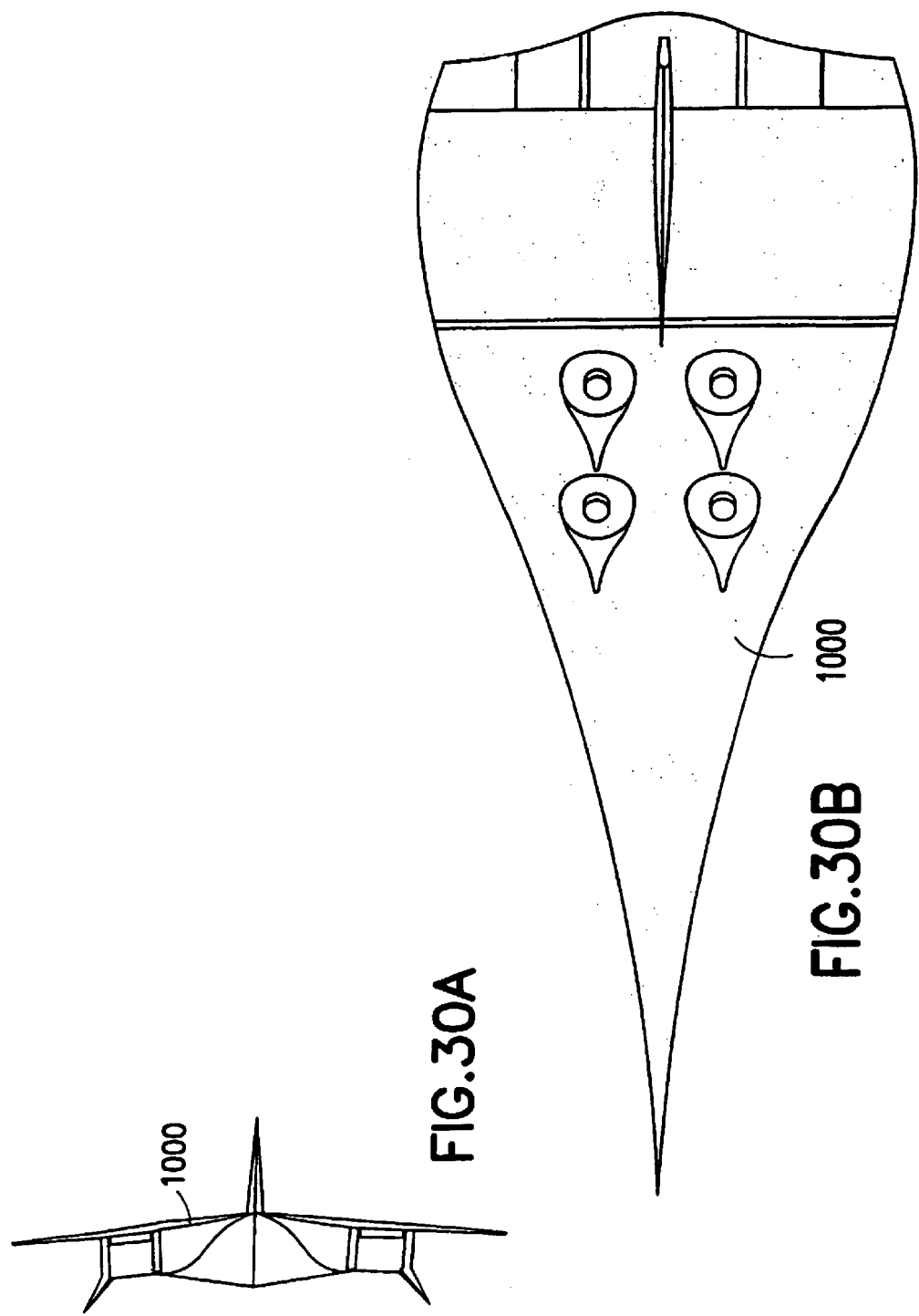
Figures 31A, 31B:
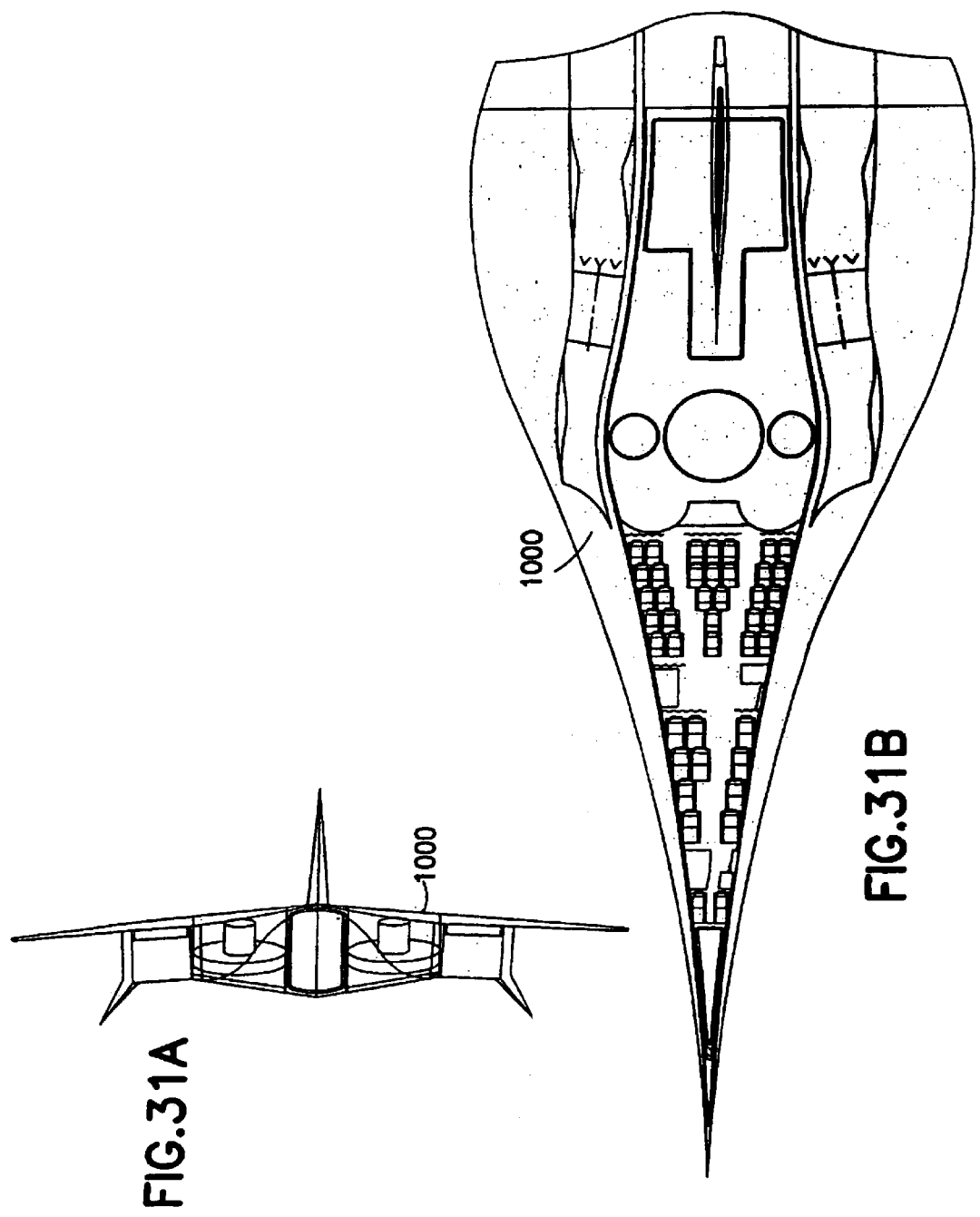
Figure 32A:
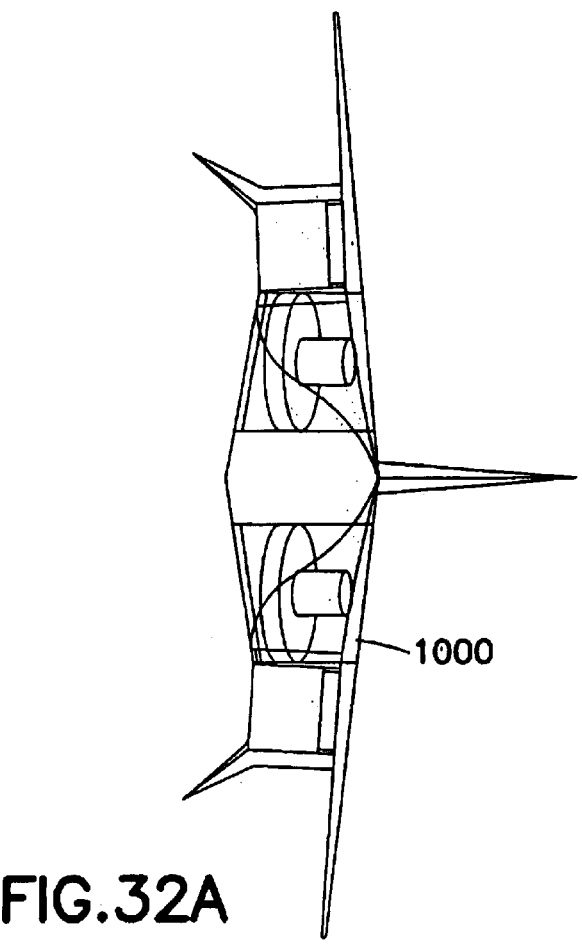
Figure 32C:
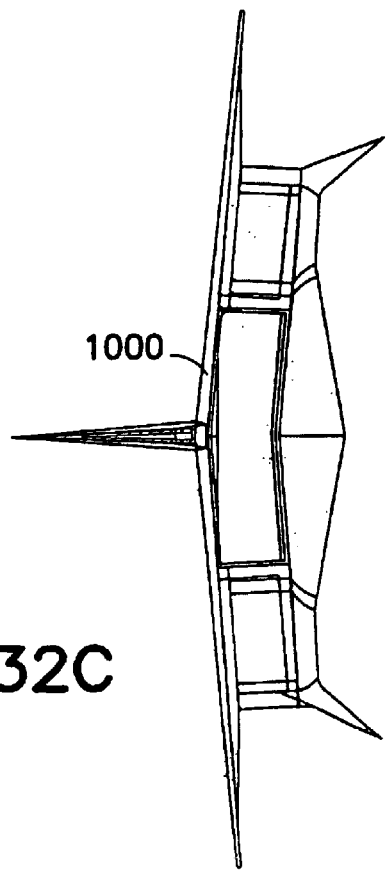

Fuel for the embodiments shown in FIGS. 26–29 is introduced into the engines at alternative locations as shown (indicated by arrows F1, F2, F3, and F4 in FIGS. 26–29 respectively), and may be staged, as a function of engine operating condition, for optimum operation of the engines. FIG. 29A shows additional alternative locations for the fuel introduction at different locations (in the directions indicated by arrows FF) upstream of the pre-burner 950D.

Foil bearings for the engines shown in FIGS. 26–29, 29A are located outside the compressor shrouds, and have a generally conical configuration to support axially forward as well as axially aftward rotor thrust loads.

FIGS. 30A–30D, 31A–31D and 32A–32D show examples of high-speed aircraft embodiments 1000–1000' that use alternative embodiments of the nested core engines in a lift-fan configuration, deriving benefit from the short axial length of the nested core engines. Alternative aircraft embodiments can be made using the nested core engines in similar aircraft configurations.

What is claimed is:
1. An air breathing gas turbine engine comprising:
 a combustion chamber section;
 a turbine section surrounding the combustion chamber section so that the combustion chamber section is nested at least in part within the turbine section, a rotor portion of the turbine section forming at least part of the combustion chamber section;

a compressor section surrounding the turbine section; and a starter cartridge located in the combustion chamber section;

wherein the compressor section has two or more spools, capable of rotation independent of one another.

2. An air breathing gas turbine engine comprising:

a casing;

a combustion chamber section located in the casing;

a turbine section surrounding the combustion chamber section so that the combustion chamber section is nested at least in part within the turbine section;

a compressor section surrounding the turbine section, the compressor section having two or more spools, capable of rotation independent of one another; and a starter cartridge mounted to the casing so that when ignited, the starter cartridge exhausts gas within the combustion chamber section.

3. The engine according to claim 2, wherein a rotor portion of the turbine section forms at least part of the combustion chamber section.

4. The engine according to claim 2, wherein the starter cartridge is a solid fuel gas generator.

5. The engine according to claim 2, wherein exhaust gas from the starter cartridge pre-warms the combustion chamber section.

6. The engine according to claim 2, wherein the starter cartridge is threaded into an aperture of the casing.

7. An air breathing gas turbine engine comprising:

a combustion chamber section;

a turbine section surrounding the combustion chamber section so that at least part of the combustion chamber section is nested within the turbine section;

a compressor section surrounding the turbine section 50 that at least part of the turbine section is nested within the compressor section; and a starter cartridge connected to the combustion chamber section for feeding gases into the combustion chamber section, wherein the starter cartridge has a base shaped to define a toroidal region of the combustion chamber section.

8. The engine according to claim 7, wherein compressor blades of a second compressor stage of the compressor section and turbine blades of a second turbine stage of the turbine section are mounted on a second rotor of the turbine engine, a second rotor portion having at least part of the turbine second stage thereon forming at least part of the combustion chamber section.

9. The engine according to claim 8, wherein the toroidal region is a recirculation region of the combustion chamber section.

10. An air breathing gas turbine engine comprising:

an outer casing;

a first rotor located in the outer casing; and a second rotor located in the outer casing, the first rotor and second rotor each being independently rotatable;

wherein the first rotor has a first compression portion, a first turbine portion and a combustion chamber portion, the first compression portion substantially surrounding the turbine portion of the first rotor and the combustion chamber portion being nested at least in part within the turbine portion of the first rotor, and wherein the first rotor has an exo-skeletal arrangement with an outer support ring retaining blades of at least one of the first compression portion or the first turbine portion.

11. The engine according to claim 10, wherein the first rotor and second rotor define a compressor section of the turbine engine, a turbine section of the turbine engine, and a combustion chamber section of the turbine engine, and wherein the combustion chamber section is surrounded by the turbine section, and the turbine section is surrounded by the compressor section.

12. The engine according to claim 11, wherein the second rotor has a second compression portion and a second turbine portion, and wherein the second rotor has another exo-skeletal arrangement with a second outer support ring retaining blades of at least one of the second compression portion or the second turbine portion.

13. The engine according to claim 11, wherein the first rotor has a fuel feed surface disposed so that when the first rotor is turned, fuel is centrifuged by the first rotor to be injected into an air flow path of the engine.

14. The engine according to claim 10, wherein the first rotor has another outer support ring retaining at least part of the blades of the first turbine portion.

15. The engine according to claim 10, wherein the outer support ring is fiber reinforced.

16. The engine according to claim 10, wherein the blades of the first turbine portion have a free inner edge.

17. The engine according to claim 10, wherein the outer support ring is reinforced by fibers circumferentially wound as filaments.

* * * * *